(12) United States Patent
Bird

(10) Patent No.: US 7,468,693 B1
(45) Date of Patent: *Dec. 23, 2008

(54) GPS ROVER STATION PROVIDING A HIGH INTEGRITY POSITION WITH A SELECTED ERROR

(75) Inventor: David G. Bird, Thornton, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/799,022

(22) Filed: Apr. 30, 2007

Related U.S. Application Data

(63) Continuation of application No. 11/138,223, filed on May 26, 2005, now Pat. No. 7,227,496.

(51) Int. Cl.
G01S 1/00 (2006.01)

(52) U.S. Cl. .............. 342/357.06; 342/357.01; 342/357.03

(58) Field of Classification Search ............ 342/357.01, 342/357.02, 357.03, 357.06; 701/207, 213, 701/215
See application file for complete search history.

(56) References Cited

U.S. PATENT DOCUMENTS

| | | | | |
|---|---|---|---|---|
| 5,343,209 | A | 8/1994 | Sennott et al. | 342/357.02 |
| 5,467,282 | A | 11/1995 | Dennis | 701/215 |
| 5,477,228 | A | 12/1995 | Tiwari et al. | 342/357.03 |
| 6,204,806 | B1 | 3/2001 | Hoech | 342/357.02 |
| 6,268,824 | B1 | 7/2001 | Zhodzishky et al. | 342/357.04 |
| 6,373,432 | B1 | 4/2002 | Rabinowitz et al. | 342/357.16 |
| 6,421,003 | B1 | 7/2002 | Riley et al. | 342/357.11 |
| 6,501,422 | B1 | 12/2002 | Nichols | 342/357.17 |
| 7,079,075 | B1 | 7/2006 | Connor et al. | 342/357.06 |
| 7,202,813 | B2 | 4/2007 | Bird et al. | 342/357.06 |
| 7,227,496 | B2 * | 6/2007 | Bird | 342/357.06 |
| 2004/0166810 | A1 | 8/2004 | Cho et al. | 342/357.11 |
| 2006/0114157 | A1 | 6/2006 | Kolanek et al. | 342/424 |

(Continued)

FOREIGN PATENT DOCUMENTS

EP 0 822 421 B1 4/1998

(Continued)

OTHER PUBLICATIONS

Herbert Landau, Ulrich Vollath & Xiaoming Chen, Virtual Reference Systems, Journal of Global Positioning Systems, 2002, vol. 1, No. 2, pp. 137-143.

(Continued)

Primary Examiner—Dao L Phan

(57) ABSTRACT

A positioning system or synthetic phase processor or rover station for providing high integrity positions with graduated accuracies. The positioning system includes one or more real time kinematic (RTK) reference stations for receiving GPS signals at established reference positions and measuring reference phases. The positioning system or the rover station selects a synthetic offset vector and uses the synthetic offset vector for inferring synthetic reference phases to a synthetic position. The rover station uses the synthetic reference phases with actual or virtual reference positions for determining a rover position having an added positional error controlled by the synthetic offset vector. For another embodiment a positioning system or a secure rover station dithers a secure position with a synthetic offset vector for providing an unsecure rover position having the added positional error.

19 Claims, 24 Drawing Sheets

U.S. PATENT DOCUMENTS

2006/0267836 A1  11/2006  Bird et al. .............. 342/357.06

FOREIGN PATENT DOCUMENTS

KR      2004-0074313 A   8/2004

OTHER PUBLICATIONS

Herbert Landau, Ulrich Vollath & Xiaoming Chen, Virtual Reference Stations versus Broadcast Solutions in RTK—Advantages and Limitations, Trimble Navigation research paper, Apr. 2003, Trimble Navigation Limited, Sunnyvale, California, pp. 1-15.

Trimble Navigation Virtual Reference Station VRS, 2001, VRS brochure, Trimble Navigation Limited, Sunnyvale, California.

* cited by examiner

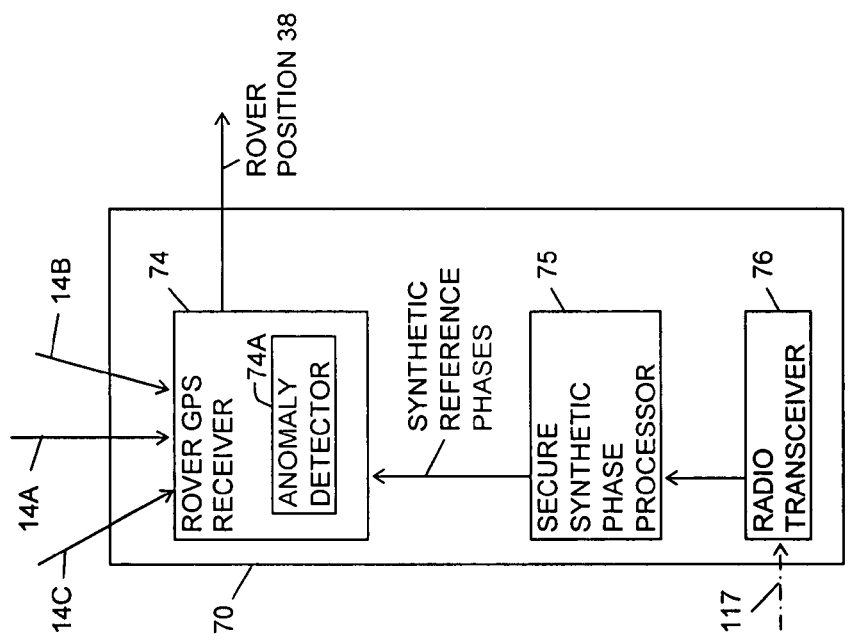
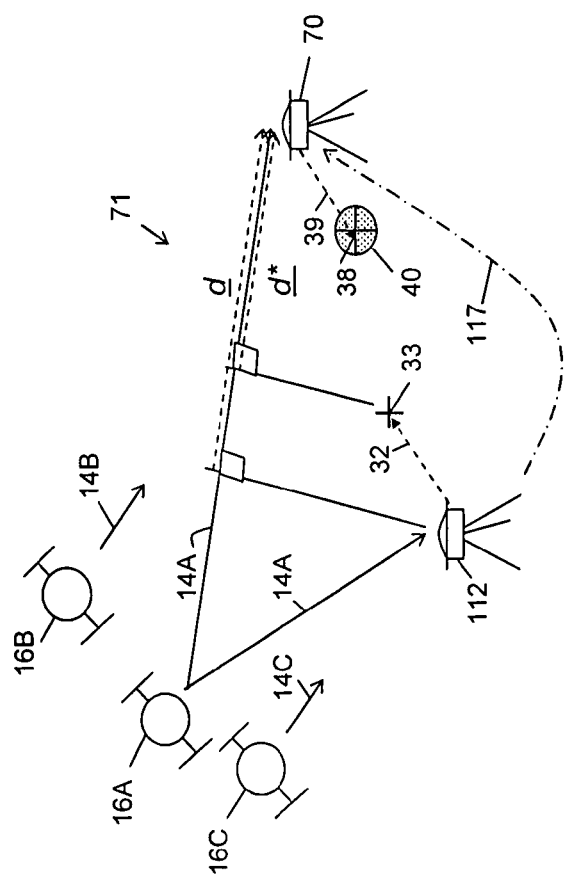
Fig. 4A
Fig. 4

GPS ROVER STATION PROVIDING A HIGH INTEGRITY POSITION WITH A SELECTED ERROR

CROSS REFERENCE TO RELATED APPLICATION

This application is a continuation of application Ser. No. 11/138,223 filed 26 May 2005, now issued 5 Jun. 2007, as U.S. Pat. No. 7,227,496, by the same inventor for the same assignee.

BACKGROUND

1. Field of the Invention

The invention relates generally to positioning and more particularly to positioning with high integrity positions having graduated accuracies.

2. Description of the Background Art

The Global Positioning System (GPS) is operated by the United States government for providing free GPS positioning signals to all users around the world. Stand alone GPS receivers can use a coarse/acquisition (C/A) code in these signals for computing unaided positions having typical accuracies of about five to twenty meters. These accuracies are sufficient for some applications including most navigation applications. However, there are positioning applications, such as survey, mapping, machine control and agriculture, where greater accuracy or integrity is needed.

Some of these needs are met by differential GPS systems that provide GPS code phase corrections. A GPS receiver that is constructed for differential GPS operation can use the code phase corrections for computing positions having typical accuracies of a few tens of centimeters to a few meters. These accuracies are sufficient for many positioning applications. However, a user cannot be altogether confident in the accuracies of stand alone or differential GPS positions because the integrity of the positions is affected by multipath. Multipath reflections of the GPS signals can cause occasional large errors of tens to hundreds of meters or even more depending on the extra distances that are traveled by reflected signals.

Fixed ambiguity real time kinematic (RTK) systems provide highly accurate GPS carrier phase measurements in order to provide greater accuracy and at the same time avoid most of the effects of multipath. A rover GPS receiver that is constructed for RTK operation can use the carrier phase measurements for determining relative positions having typical accuracies of about a centimeter to a few tens of centimeters. The term "fixed ambiguity" refers to the fact that an integer number of cycles of carrier phase is resolved (fixed) for the RTK carrier phase measurements between the reference phase and the phase measured by the rover. The resolution of the carrier cycle integer traps multipath signal errors that are greater than a portion of the wavelength of the carrier of the GPS signal, resulting in a high confidence and integrity for the RTK-based positions.

Existing GPS RTK systems provide fixed RTK carrier phase measurements to the users for a cost that is largely driven by the fixed infrastructure costs for providing the system divided by the number of users. However, some users require the integrity of fixed RTK-based positioning but do not require the full accuracy that it provides. Unfortunately, there is no existing technique for spreading the infrastructure costs across more users by providing high integrity positions with accuracies that are lower than the full accuracy of the system.

SUMMARY

The present disclosure describes ways of providing high integrity positioning with controlled accuracies for a rover station either by providing synthetic reference phases for a GPS reference system or by dithering a secure rover position.

Briefly, several systems are disclosed using measurements of or including one or more real time kinematic (RTK) reference stations for receiving GPS signals at one or more actual reference positions and for measuring reference phases. When three or more reference stations are used, virtual reference phases may be determined for a virtual reference position. A synthetic offset vector is generated in a reference station, a server in the reference system, an RTK rover station, or a synthetic phase processor interacting between the reference stations and the rover station. Reference phase measurements are used with the synthetic offset vector for inferring synthetic reference phases for a synthetic position where the synthetic position is not equal to any of the actual or virtual reference positions. The rover station uses the actual or virtual reference position with the synthetic reference phases in place of the actual or virtual reference phases for computing a rover position with respect to the actual or virtual reference position having an added positional error that is proportional to the synthetic offset vector.

In another approach a secure RTK rover station uses a synthetic offset vector directly for dithering a secure rover position determined from the actual or virtual reference phase. The synthetic offset vector may be generated in a reference station, a server in the reference system, the rover station, or a processor acting between the reference system and the rover station. The positions determined by the rover station have the integrity of the RTK system with accuracy controlled by the synthetic offset vector.

One embodiment is a secure rover station having a controlled accuracy for a geographical position, comprising: a rover global navigation satellite system (GNSS) receiver for determining a secure position not available to a user of the rover station; and a position dither processor for dithering the secure position with a selected non-zero synthetic offset vector for issuing a rover position available to the user having an added position error proportional to the synthetic offset vector.

Another embodiment is a method for controlling accuracy of a geographical position, comprising: receiving a global navigation satellite system (GNSS) signal; using the GNSS signal for determining a secure position not available to a user of the rover station; and dithering the secure position with a selected non-zero synthetic offset vector for providing a rover position having an added position error proportional to the synthetic offset vector to the user.

Another embodiment is a tangible medium containing a set of instructions for causing a processor to carry out the following steps for controlling accuracy of a geographical position, comprising: receiving a global navigation satellite system (GNSS) signal; using the GNSS signal for determining a secure position not available to a user of the rover station; and dithering the secure position with a selected non-zero synthetic offset vector for providing a rover position available to the user having an added position error proportional to the synthetic offset vector.

These and other embodiments and benefits of the present invention will no doubt become obvious to those of ordinary skill in the art after having read the following best mode for carrying out the invention and viewing the various drawings.

BRIEF DESCRIPTION OF THE DRAWINGS

FIG. 4 is a diagram showing a secure rover station for computing synthetic reference phases for adding a position error to a rover position operating in a single reference positioning system;

FIG. 4A is a block diagram of the rover station of FIG. 4;

DETAILED DESCRIPTION

The details of several embodiments for carrying out the idea of the invention will now be described. It should be understood that the description of these details is not intended to limit the invention to these details. On the contrary these details are merely intended to describe the best mode for carrying out the idea of the invention. Numerous alternatives, modifications and equivalents of the embodiments described herein will be apparent to someone skilled in the art as within the scope of the idea of this invention. An embodiment of the invention is described for the global positioning system (GPS). However, it will be apparent to those in the art that the invention may be carried out with a generic global navigation satellite system (GNSS) including the global positioning system (GPS), the global orbiting navigation system (GLONASS), the Galileo system or a combination of these systems. It should also be noted that pseudolites may be used in place of satellites for broadcasting GNSS positioning signals.

Figure 1:
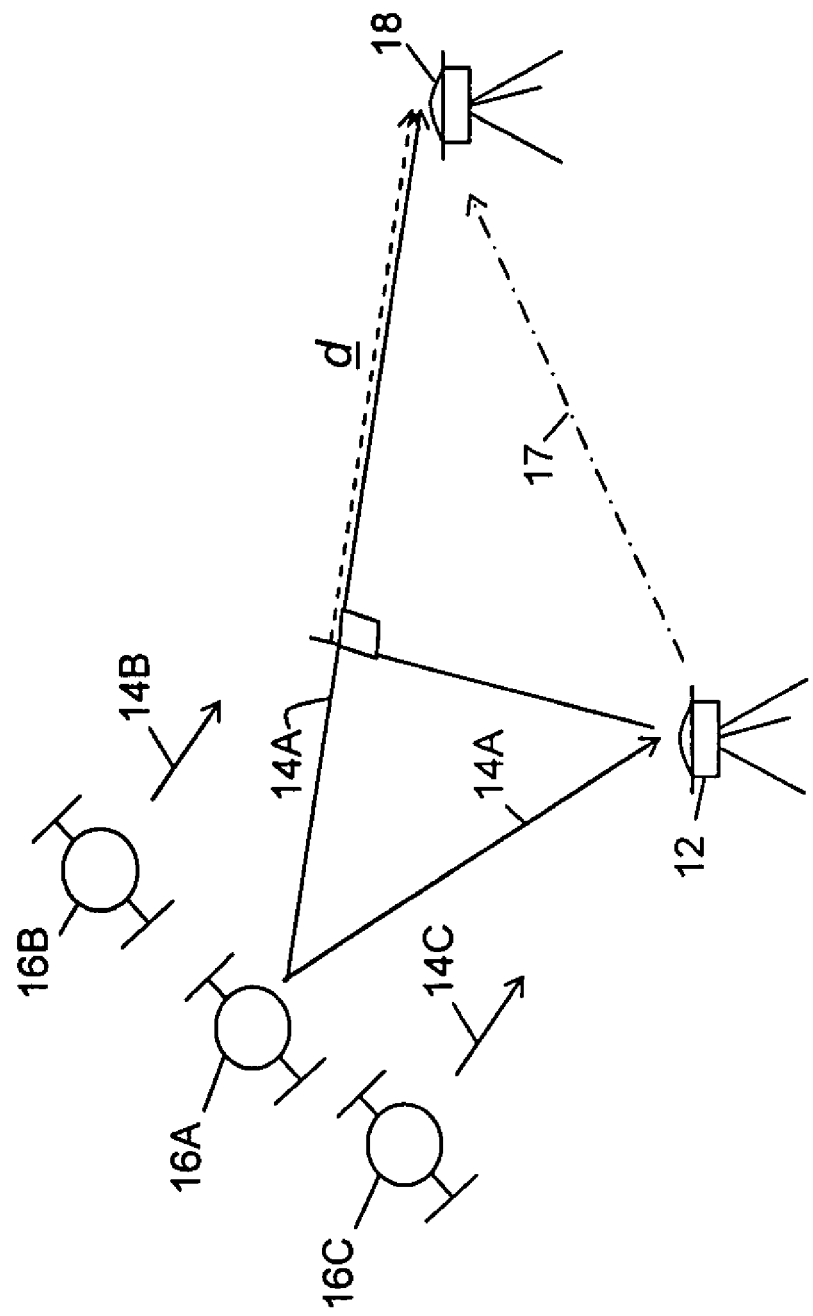
FIG. 1 is a diagram of a single reference system of the prior art for providing reference phases to a rover station.

FIG. 1 is a diagram showing a conventional real time kinematic (RTK) global positioning system (GPS)-based system of the prior art. The reference station 12 includes a reference GPS receiver for receiving GPS signals 14, illustrated as 14A, 14B and 14C, from GPS satellites 16, illustrated as 16A, 16B and 16C. The reference station 12 measures the carrier phases of the GPS signals 14 and sends a radio signal 17 having reference data for the measured phases and reference geographical position to one or more rover stations shown as rover 18. The rover station 18 includes an RTK GPS receiver for measuring the carrier phases for the same GPS signals 14.

The difference between the reference and rover phase measurements yields estimates of perpendicular distance vectors represented by a vector d between the rover station 18 and the GPS satellite 16A. Measurements from several GPS satellites 16 yield estimates of several perpendicular distance vectors and ultimately the position of the rover station 18 with respect to the reference station 12. The vector d may be understood as a dot product of the vector between the GPS satellite 16 and the rover station 18 and the vector between the reference station 12 and the rover station 18. An exemplary RTK GPS system is described in U.S. Pat. No. 5,519,620, entitled "centimeter accurate global positioning system receiver for on-the-fly real-time-kinematic measurement and control" by Nicholas C. Talbot et al., incorporated herein by reference.

Figure 1A:
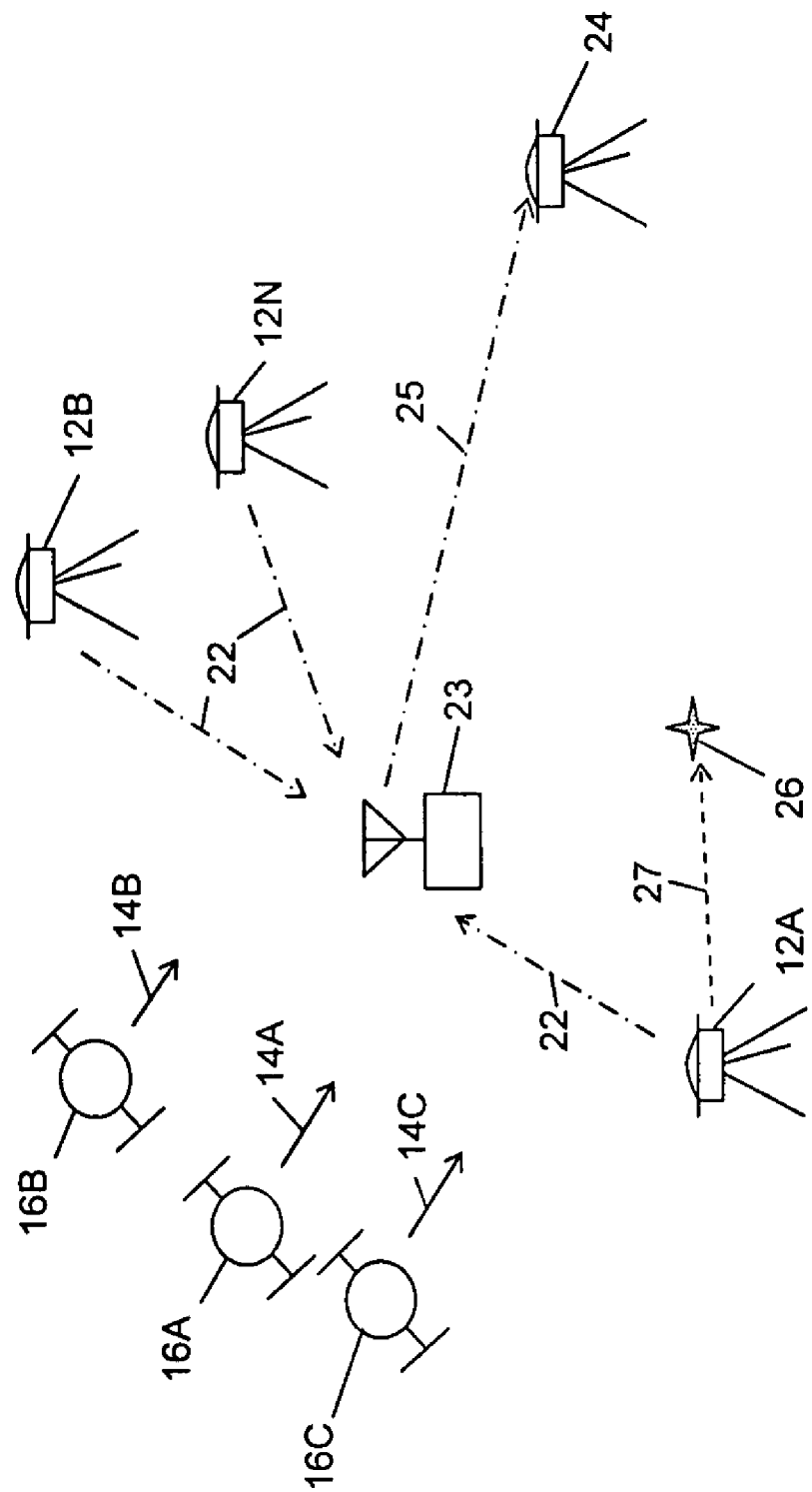
FIG. 1A is a diagram of a reference network positioning system of the prior art for providing reference phases to a rover station.

FIG. 1A is a diagram showing a virtual reference system (VRS) RTK GPS-based system of the prior art. Reference network stations 12A, 12B through 12N include reference GPS receivers for measuring carrier phases of the GPS signals 14 received from the GPS satellites 16. The reference stations 12A-N send signals 22 having reference data for their measured phases and reference geographical positions to a server 23. One of the reference stations, illustrated as 12A, is designated as a master reference station. The server 23 and the master reference station 12A may be located together. The server 23 communicates with one or more VRS RTK GPS rover stations with a radio signal 25. The VRS RTK GPS rover stations are shown as rover 24.

The server 23, or the server 23 together with the rover station 24, determine a virtual reference position 26 and a virtual vector 27 between the position of the master reference station 12A and the virtual reference position 26; and then uses the position and measured phases of the master reference station 12A, the positions and measured phases of the auxiliary reference stations 12B-N and the virtual vector 27 (or virtual reference position 26) to calculate virtual reference phases for the virtual reference position 26 according to a virtual reference system (VRS) parametric model. The rover station 24 includes an RTK GPS receiver for measuring the phases for the same GPS signals 14. The difference between the virtual reference and rover phase measurements yields estimates of perpendicular distance vectors to the GPS satellites 16 analogous to the vector d, described above, and ultimately the position of the rover station 24 with respect to the virtual reference position 26.

The use of a network of reference stations instead of a single reference allows modeling of the systematic ionosphere and troposphere parametric errors in a region and thus provides the possibility of error reduction. Networks exist using public domain RTCM and CMR standards for bi-directional communication reference data to the rovers. Detailed information on the modeling of the errors is available in "Virtual Reference Station Systems" by Landau et al., published by the Journal of Global Positioning Systems for 2002, Vol. 1, No. 2 pages 137-143.

Figure 2A:
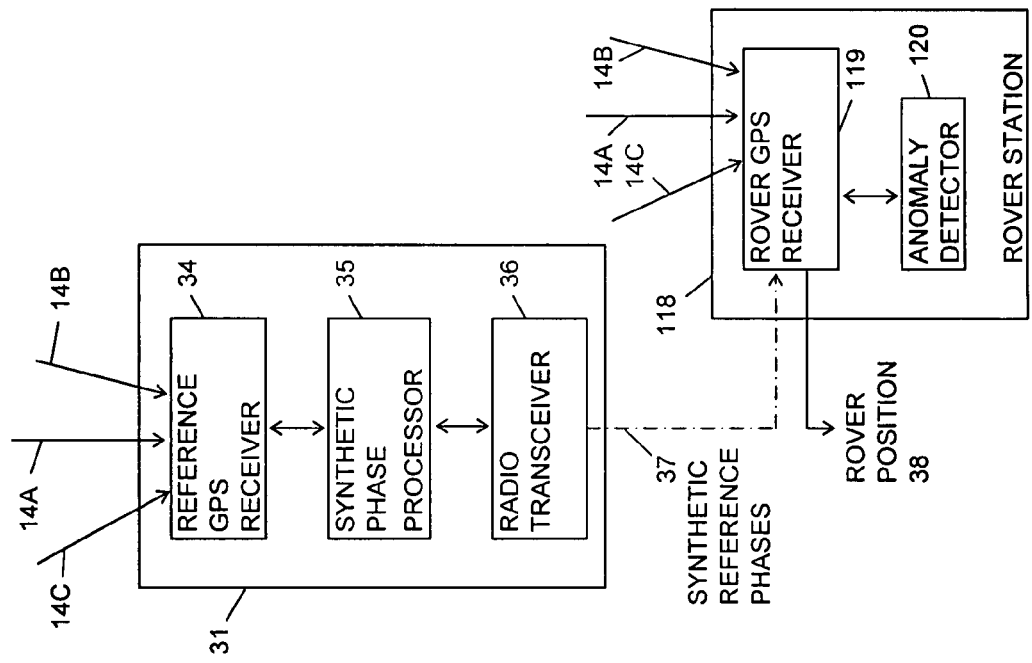
FIG. 2A is a block diagram of a reference station for the system of FIG. 2.
Figure 2:
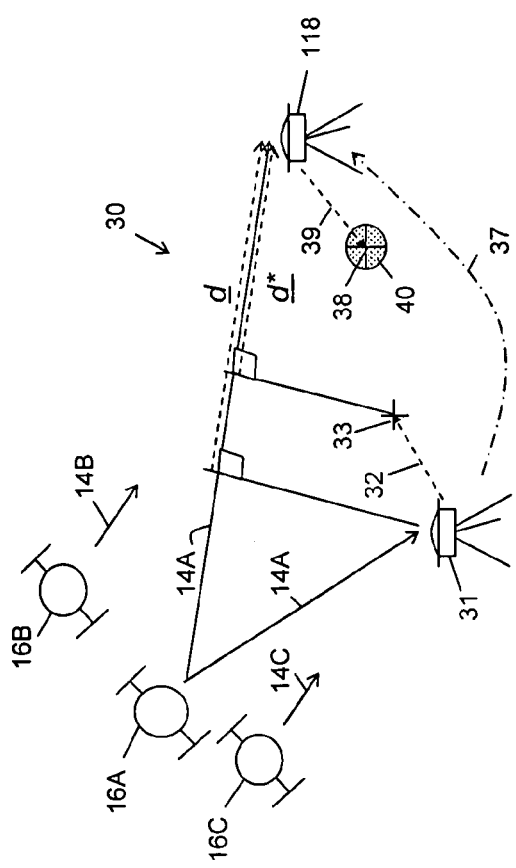
FIG. 2 is a diagram of a single reference positioning system for providing synthetic reference phases to a rover station for adding a position error to a rover position.

FIG. 2 is a diagram showing a real time kinematic (RTK) GPS-based positioning system referred to with a reference number 30. The positioning system 30 includes at least one reference station 31 for receiving the GPS signals 14 from the GPS satellites 16. The reference station 31 has a reference position that is established by a survey or some other means. The system 30 receives or generates a synthetic offset vector 32 for controlling the positioning accuracy that is provided by the system 30 for one or more RTK GPS rover stations 118. The reference position and the synthetic offset vector 32 define a synthetic position 33 where the synthetic position 33 is separated from the reference position by the synthetic offset vector 32. The length and direction of the synthetic offset vector 32 are arbitrary. However, it is normally a few meters or less.

FIG. 2A is a block diagram showing the reference station 31 and the rover station 118. The reference station 31 includes a reference GPS receiver 34, a synthetic phase processor 35 and a radio transceiver 36. The reference GPS receiver 34 and the synthetic phase processor 35 may be separate or combined into a single unit. The radio transceiver 36 may be a transmitter without a receiver if two-way transmission with the rover station 118 is not required. The reference GPS receiver 34 measures the carrier phases of the GPS signals 14. The processor 35 uses the synthetic offset vector 32 with the reference position for the station 31 and the three dimensional angles to the GPS satellites 16 for inferring the synthetic reference phases for the carrier phases that would be measured if the measurements were made at the synthetic position 33.

The radio transceiver 36 sends a radio signal 37 having synthesized reference data for the synthetic reference phases and the reference position to the rover station 118. Cellular or landline telephones may be used to provide or to augment the radio signal 37. The synthesized reference data still includes a correct geographical reference position of the reference station 31, as is conventional, but the phases for the GPS signals 14 are not the actual phases that are measured at the reference position but are instead the synthetic reference phases that are calculated from the measured reference phases, the actual reference position and the synthetic offset vector 32 (or synthetic position 33).

The rover station 118 includes a rover GPS receiver 119 and an anomaly detector 120. The rover GPS receiver 119 receives the GPS signals 14 and measures the carrier phases from the same GPS satellites 16 and computes the differences between the measured rover phases and the synthetic reference phases. Using the synthetic reference phases in place of the actual reference phases, it now arrives at estimated perpendicular distance vectors represented by the vector d* instead of the estimated perpendicular distance vectors represented by the vector d described above. The vector d* may be understood as a dot product of the vector between the GPS satellite 16A and the rover station 118 and the vector between the synthetic position 33 and the rover station 118. When the rover station 118 calculates its position with respect to the reference station 31, it arrives at a position 38 that has an added positional error 39 of equal length in the opposite direction as the synthetic offset vector 32. Using this technique the positioning system 30 is able to arbitrarily introduce the added error 39 into the position 38 that is calculated by the rover station 118.

The rover GPS receiver 119 determines double difference phase residuals from current and previous synthetic reference phases and current and previous measured rover phases and passes the phase residuals to the anomaly detector 120. The anomaly detector 120 detects a phase residual anomaly when the phase residual is greater than a phase threshold corresponding to a selected distance for an integrity limit 40 for RTK operation. The integrity limit 40 corresponds to an outer limit of a zone about the rover position 38. When an anomaly is detected, the anomaly detector 120 inhibits the rover GPS receiver 119 from providing the rover position 38 to the user of the rover station 118, or provides a notification to the user that the anomaly was detected and allows the user to decide whether or not to use the position 38. Alternatively, the anomaly detector 120 provides a solution for the rover position 38 where the synthetic reference phase and measured rover phase for the particular GPS signal 14 associated with the anomaly are not used. The effect of the system 30 is that the rover position 38 has the controlled added position error 39 without degrading the integrity limit 40 of the RTK positioning solution of the rover position 38.

Figure 3A:
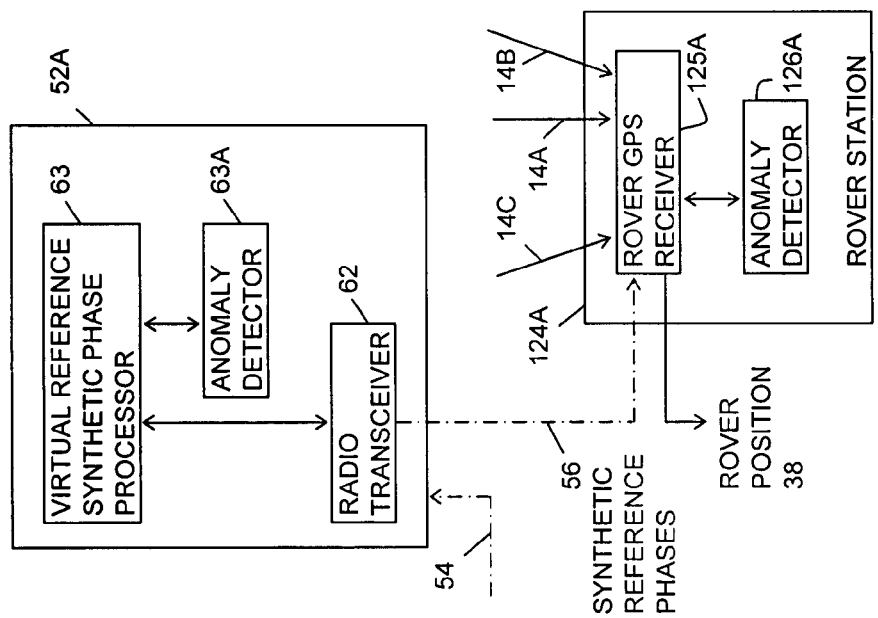
FIGS. 3A, 3B and 3C are block diagrams of first, second and third embodiments of a server for the positioning system of FIG. 3.
Figure 3:
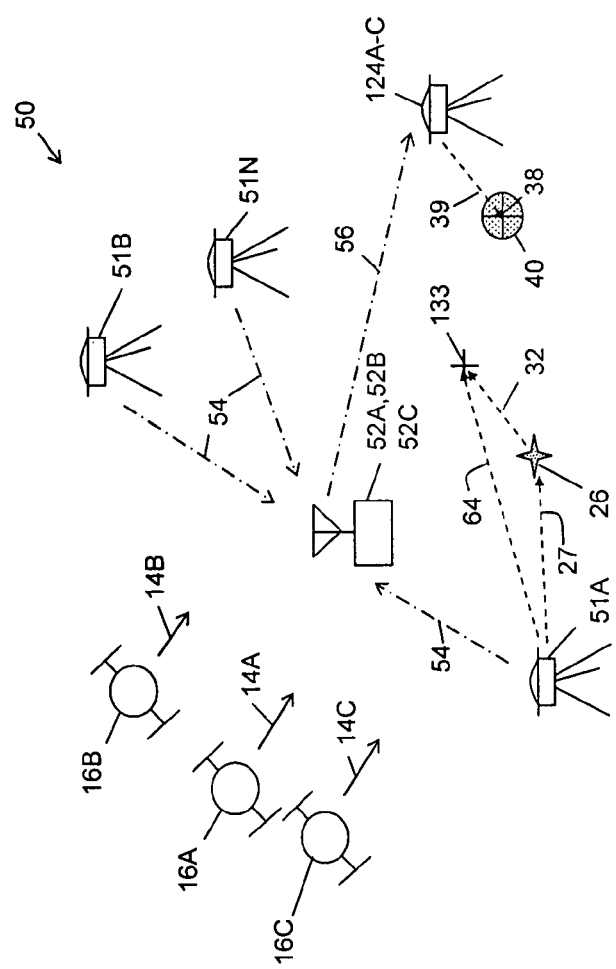
FIG. 3 is a diagram of a reference network positioning system for providing synthetic reference phases to a rover station for adding a position error to a rover position.

FIG. 3 is a diagram showing a network embodiment of a real time kinematic (RTK) GPS-based positioning system referred to by a reference number 50. The positioning system 50 includes a network of reference stations, referred to as 51A, 51B through 51N, for receiving the GPS signals 14 from the GPS satellites 16. The reference network stations 51A-N have reference positions established by a survey or some other means. The system 50 receives or generates a synthetic offset vector 32 for controlling the positioning accuracy that is provided by the system 50 for one or more RTK GPS rover stations shown as a rover station 124A, 124B or 124C. The rover station 124A, 124B or 124C includes a rover GPS receiver 125A, 125B or 125C, respectively, and an anomaly detector 126A, 126B or 126C, respectively.

The positioning system 50 also includes a server 52A, 52B or 52C. The server 52A-C and the reference network stations 51A-N communicate with radio signals 54. One of the network stations, for example the station 51A, may be designed as a master and the other reference network stations 51B-N as auxiliaries. The master reference station 51A and the server 52A-C may be co-located and may or may not share processing power; or the master reference station 51A and the server 52A-C may be physically separated.

The reference network stations 51A-N measure carrier phases of the GPS signals 14 and then communicate their phase measurements to the server 52A-C. The server 52A-C communicates with the rover station 124A-C with a radio signal 56. In a conventional system, the server 23 uses the virtual vector 27 and the master and auxiliary reference positions and phases for determining the virtual reference phases for the virtual reference position 26. The sum of the virtual vector 27 and the synthetic offset vector 32 is a master synthetic vector 64. The position of the master reference station 51A and the master synthetic vector 64 define a synthetic position 133. The system 50 uses the synthetic offset vector 32 and the virtual vector 27 (or the master synthetic vector 64) and the master and auxiliary reference positions and phases for determining the synthetic reference phases for the synthetic position 133.

The rover station 124A-C expects reference phases as if the phases are measured at the virtual reference position 26, however, it receives the synthetic reference phases inferred for the synthetic position 133. The rover GPS receiver 125A-C receives the GPS signals 14 and measures the carrier phases from the same GPS satellites 16; and computes the differences between the measured rover phases and the synthetic reference phases. Using the synthetic reference phases in place of the virtual reference phases, it now arrives at estimated perpendicular distance vectors represented by the vector d* as described above. When the rover station 124A-C calculates its position with respect to the virtual position 26, it arrives at the position 38 relative to the virtual reference position 26 that has the added positional error 39 that is equal in length and in the opposite direction as the synthetic offset vector 32. Using this technique the positioning system 50 is able to arbitrarily introduce the added error 39 into the position 38 that is calculated by the rover station 124A-C.

The server 52A-C and the rover station 124A-C may use two-way communication to agree on the geographical position for the virtual reference position 26. For example, the virtual reference position 26 may be selected to be the best estimated position of the rover station 124A-C. It should be noted that the invention is not dependent on the location of the processing power of the server 52A-C. The processing power of the server 52A-C may be located anywhere within communication range and may be distributed in several locations. Cellular or landline telephones may be used to provide or to augment the radio signals 54 and/or 56.

FIG. 3A is a block diagram of the server 52A. The server 52A includes a radio transceiver 62, a virtual reference synthetic phase processor 63 and an anomaly detector 63A. The server 52A receives data for the reference positions (or it already has the reference positions) and the reference phases from the reference stations 51A-N. The processor 63 uses a virtual reference system (VRS) parametric model with the master synthetic vector 64 (in place of the virtual vector 27) together with the master and auxiliary reference network positions and phases for the reference network stations 51A-N and the three dimensional angles to the GPS satellites 16 for inferring the synthetic reference phases that would be measured if the measurements were made at the synthetic position 133 (instead of the virtual reference position 26).

The radio transceiver 62 transmits the radio signal 56 having synthesized reference data to the rover station 124A. The synthesized reference data still includes a correct geographical virtual reference position 26, as is conventional, but includes the synthetic reference phases in place of the actual or virtual reference phases that are used by a conventional rover station for positioning operation without the accuracy control of the present invention.

Figures 3B, 3C:
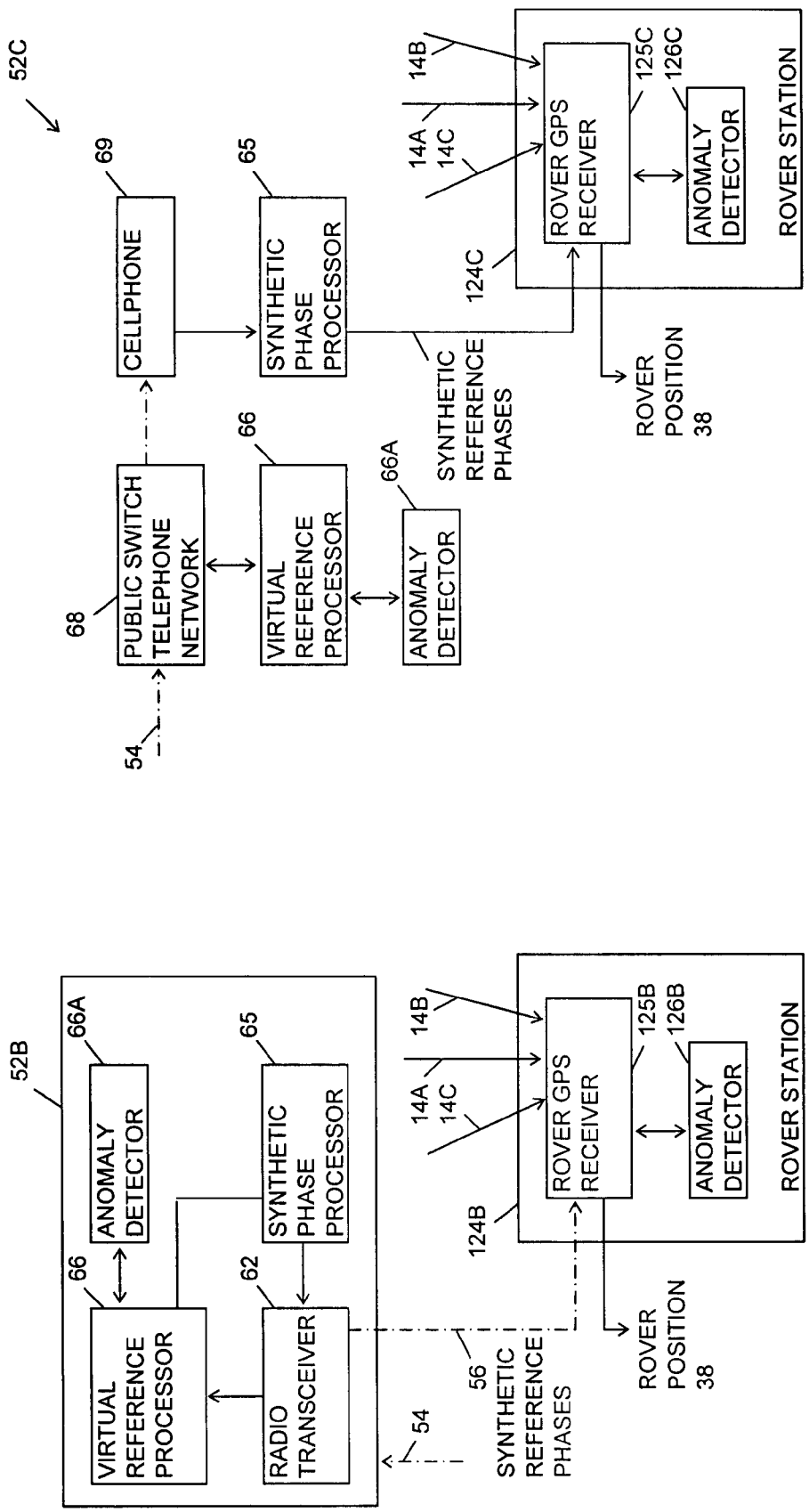

FIG. 3B is a block diagram of the server 52B. The server 52B includes the radio transceiver 62, a synthetic phase processor 65, a virtual reference processor 66 and an anomaly detector 66A. The server 52B receives data for the reference positions (or it already has the reference positions) and the reference phases from the reference stations 51A-N. The virtual reference processor 66 uses the virtual vector 27 and the reference positions and phases for the reference stations 51A-N with the three dimensional angles to the GPS satellites 16 for determining the virtual reference phases. The virtual reference processor 66 then passes the virtual reference phases and the virtual reference position 26 to the synthetic phase processor 65.

The synthetic phase processor 65 uses the synthetic offset vector 32 with the virtual reference phases and the three dimensional angles to the GPS satellites 16 for inferring the synthetic reference phases for the carrier phases that would be measured if the measurements were made at the synthetic position 133. The radio transceiver 62 transmits the radio signal 56 having synthesized reference data to the rover station 124B. The synthesized reference data still includes a correct geographical virtual reference position 26, as is conventional, but the phases for the GPS signals 14 are not the virtual reference phases that would be measured at the virtual reference position 26 but are instead synthetic reference phases that would be measured at the synthetic position 133.

FIG. 3C is a block diagram of the server 52C. The synthetic phase processor 65 is located separately from the virtual reference processor 66. The server 52C uses the public switch telephone network (PTSN) telephone system 68 for receiving reference data and uses the telephone system 68 for communication between the virtual reference processor 66 and the synthetic phase processor 65. The processor 65 receives data for the virtual reference position 26 and virtual reference phases from the virtual reference processor 66 and then infers the synthetic reference phases as described above. The processor 65 may be located adjacent to the rover station 124C having a local wired connection or a cellular telephone 69 may be used to pass the synthetic reference phases to the rover station 124C.

The virtual reference processors 63 and 66 determine double difference phase residuals between the master and auxiliary phases for current and previous phase measurements and pass the phase residuals to the respective anomaly detectors 63A and 66A. The anomaly detector 63A and 66A detects a phase residual anomaly when the phase residual is greater than a phase threshold corresponding to a selected distance or integrity limit 40 for RTK operation. The virtual reference processors 63 and the anomaly detectors 63A and 66A, respectively, may share hardware and software.

The rover GPS receivers 125A-C also determine double difference phase residuals. The phase residuals determined in the rover GPS receivers are the differences between the rover phases and the synthetic reference phases for current and previous phase measurements. The rover GPS receivers 125A-C pass the phase residuals to the respective anomaly detectors 126A-C. The anomaly detectors 126A-C also detect a phase residual anomaly when the phase residual is greater than a phase threshold corresponding to a selected distance or integrity limit 40 for RTK operation. The rover GPS receiver 125A-C and the anomaly detector 126A-C, respectively, may share hardware and software.

The integrity limit 40 corresponds to a zone about the rover position 38. When an anomaly is detected, the anomaly detector 63A, 66A or 126A-C inhibits the rover GPS receiver 125A-C from providing the rover position 38 to the user of the rover station 124A-C, or provides a notice to the user that the anomaly was detected and allows the user to decide whether or not to use the position 38. Alternatively, the rover station 124A-C provides a solution for the rover position 38 where the synthetic reference phase and measured rover phase for the particular GPS signal 14 associated with the anomaly are not used. The effect of the system 50 is that the rover position 38 has the controlled added position error 39 without degrading the integrity limit 40 of the RTK positioning solution for the rover position 38.

In the system 50, it may be beneficial to reduce the amount of data that is transmitted among various locations by sending differences between master and auxiliary reference network positions and/or reference network phases in place of the actual reference positions and phases. For example, the reference positions and phases for the auxiliary stations 51B-N may be transmitted as differences with respect to the reference position and phases the master reference station 51A.

FIG. 4 is a diagram showing a secure real time kinematic (RTK) GPS rover station 70 for receiving conventional reference data in a secure format from a GPS-based positioning system 71. The positioning system 71 includes at least one reference station 112 having a reference position that is established by a survey or some other means for receiving GPS signals 14 from GPS satellites 16. The reference station 112 measures the carrier phases of the GPS signals 14 and sends a radio signal 117 having secure reference data for the reference phases to the rover station 70. The security of the reference data may be maintained by the measures of the Digital Millennium Copyright Act of 1998 for preventing unauthorized access to a copyrighted work. Alternatively, the reference data may be encrypted.

The rover station 70 receives or generates or otherwise selects the synthetic offset vector 32. The synthetic offset vector 32 and the reference position of the reference station 112 define a synthetic position 33 as described above. The length and direction of the synthetic offset vector 32 is arbitrary but the length is normally a few meters or less. When it is desired for the rover station 70 to operate with existing RTK GPS-based reference systems, the reference station 112 may be a conventional reference station 12 described above with the addition of security measures for protecting the reference data from unauthorized access.

FIG. 4A is a block diagram of the rover station 70. The rover station 70 includes an RTK rover GPS receiver 74 including an anomaly detector 74A, a secure synthetic phase processor 75, and a radio transceiver 76. The rover GPS receiver 74 measures the carrier phases for the same GPS signals 14 that are measured by the reference station 112. The radio transceiver 76 may be replaced by a radio receiver without a transmitter if two-way communication is not required. A cellular telephone may be used for the radio transceiver 76. The radio transceiver 76 receives the reference position and the secure reference data for the reference phases in the radio signal 117.

The secure synthetic phase processor 75 selects the synthetic offset vector 32 and then uses the synthetic offset vector 32 with the reference position, the secure reference phases and the three dimensional angles to the GPS satellites for inferring the synthetic reference phases. The secure synthetic phase processor 75 performs processing on signals and data within physical boundaries of the processor 75 in a way that makes it difficult for an authorized user to alter the processing algorithms or view the signals or data. Further, the algorithms, signals, messages and data are protected by the access controls of the Digital Millennium Copyright Act of 1998.

The secure synthetic phase processor 75 passes the synthetic reference phases to the rover GPS receiver 74. The GPS receiver 74 uses the synthetic reference phases and the measured rover phases with the reference position and the three dimensional angles to the GPS satellites 16 to compute the rover position 38. The conventional rover station 18 would calculate the difference between the reference and rover phase measurements for the distance vectors represented by the vector d to the GPS satellite 16A. However, the rover station 70 arrives at estimated perpendicular distance vectors represented by d* instead of the vectors represented by d.

When the rover station 70 calculates its position with respect to the reference station 112, it arrives at a position 38 that has a vector position offset error 39 of equal length and in the opposite direction as the synthetic offset vector 32. The security measures in the secure processor 75 prevent the user from undoing the accuracy control of the present invention by using the measured reference phases instead of the synthetic reference phases. Measurements by the rover GPS receiver 74 from several GPS satellites 16 yield several perpendicular distance vectors d* and ultimately the position of the rover station 70 with respect to the reference station 112 with the added error 39. Using this technique the secure synthetic phase processor 75 is able to introduce the arbitrary added error 39 into the position 38 that is calculated by the rover station 70.

The rover GPS receiver 74 determines phase residuals from current and previous synthetic reference phases and measured rover phases and passes the phase residuals to the anomaly detector 74A. The anomaly detector 74A detects a phase residual anomaly when the phase residual is greater than a phase threshold corresponding to a selected integrity limit 40 for RTK operation. The integrity limit 40 corresponds to a zone about the rover position 38. When an anomaly is detected, the anomaly detector 74A inhibits the rover GPS receiver 74 from providing the rover position 38 to the user of the rover station 70, or provides a notification to the user that the anomaly was detected and allows the user to decide whether or not to use the position 38. Alternatively, the anomaly detector 74A provides a solution for the rover position 38 where the synthetic reference phase and measured rover phase for the particular GPS signal 14 associated with the anomaly are not used. The effect of the system 70 is that the rover position 38 has the controlled added position error 39 without degrading the integrity limit 40 of the RTK positioning solution for rover position 38.

Figure 5:
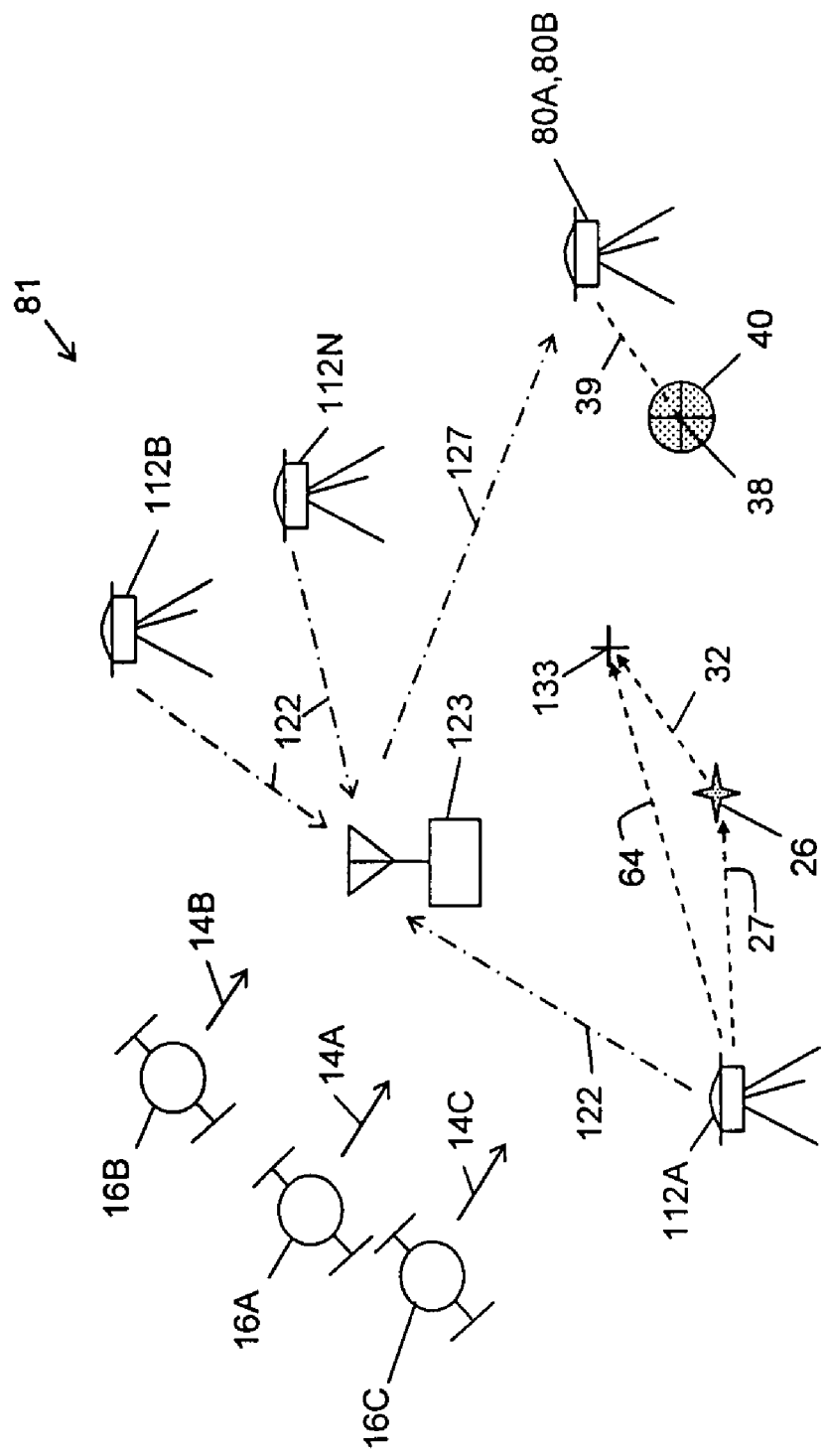
FIG. 5 is a diagram showing a secure rover station for computing synthetic reference phases for adding a position error to a rover position in a reference network positioning system.

FIG. 5 is a diagram showing a secure real time kinematic (RTK) GPS rover station 80A or 80B for receiving conventional reference data in a secure format from a network positioning system 81. The rover station 80A-B receives reference data having secure reference phases from the system 81 and selects the synthetic offset vector 32 for controlling the positioning accuracy that it provides. The security of the reference phases may be protected by the access control measures of the Digital Millennium Copyright Act of 1998 and/or by encryption. The positioning system 81 includes a server 123 and a network of reference network stations, referred to as 112A, 112B through 112N, having reference positions that are known from a survey or other means.

The reference network stations 112A-N include reference GPS receivers for receiving the GPS signals 14 from the GPS satellites 16 and measuring carrier phases. When it is desired for the rover station 80A-B to operate with existing RTK GPS-based reference systems, the reference stations 112A-N may be conventional reference stations 12A-N and the server 123 may be the conventional serve 23 described above with the addition of security measures for protecting the reference data. One of the reference stations, illustrated as 112A, may be designated as a master reference station and the other reference network stations 112B-N as auxiliaries.

The reference network stations 112A-N communicate with the server 123 in signals 122 and the server communicates with the rover station 80A-B with a radio signal 127 having a secure data format so that the reference phases cannot easily be used by an unauthorized user. The sum of the virtual vector 27 and the synthetic offset vector 32 is a master synthetic vector 64. The position of the master reference station 112A and the master synthetic vector 64 define a synthetic position 133.

Figure 5B:
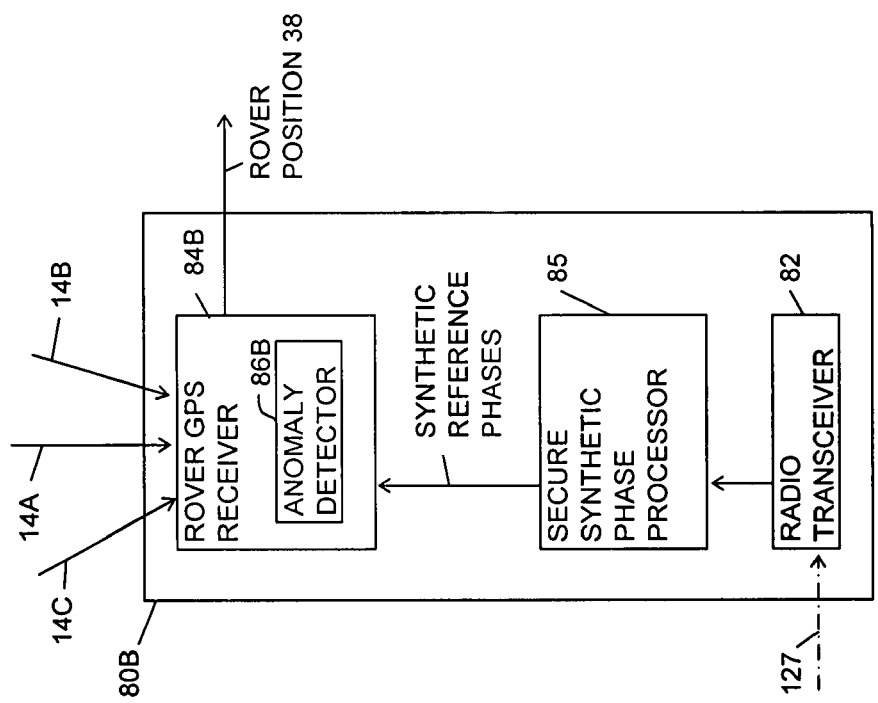
FIGS. 5A and 5B are block diagrams of first and second embodiments of the rover station of FIG. 5.
Figure 5A:
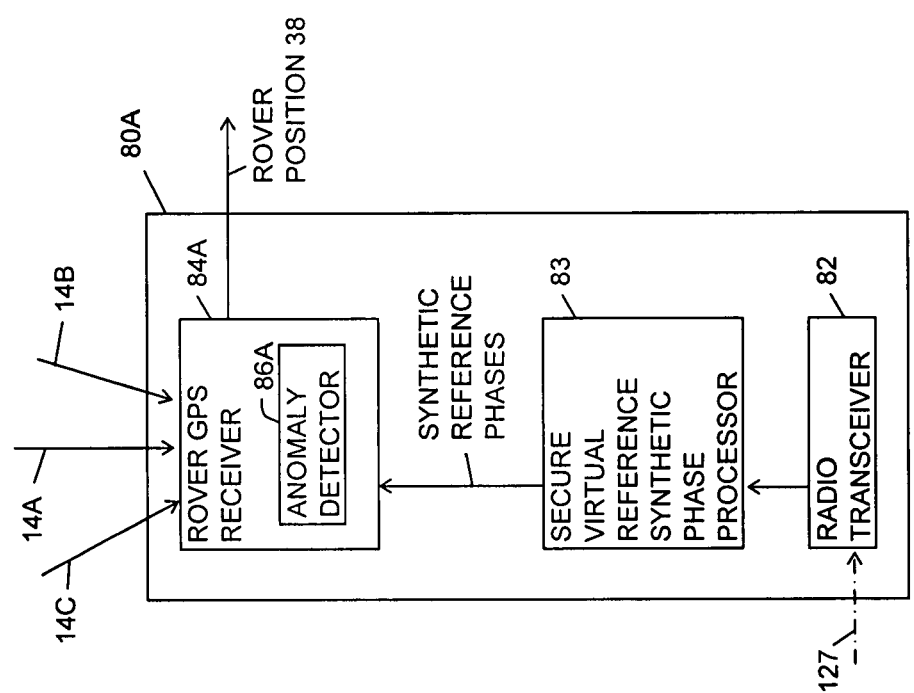

FIG. 5A is a block diagram of the rover station 80A. The rover station 80A includes a radio transceiver 82, a secure virtual reference synthetic phase processor 83 and an RTK rover GPS receiver 84A including an anomaly detector 86A. The radio transceiver 82 receives data for the master and auxiliary reference positions and phases for the master and auxiliary reference network stations 112A-N in the radio signal 127. The radio transceiver 82 may be a radio receiver without a transmitter if two-way communication is not required. The radio transceiver 82 may be a cellular telephone. In order to reduce the amount of data that is transmitted, the reference positions and phases for the auxiliary reference stations 112B-N may be transmitted as differences from the reference position and phases of the master reference station 112A.

The synthetic phase processor 83 receives or generates or otherwise selects the synthetic offset vector 32 and then determines the virtual reference position 26, or negotiates with the server 123 to determine the virtual reference position 26. The virtual reference position 26 and the synthetic offset vector 32 define the synthetic position 133 where the synthetic position 133 is separated from the virtual reference position 26 by the synthetic offset vector 32. The processor 83 determines the master synthetic vector 64 from the vector sum of the virtual vector 27 and the synthetic offset vector 32 (or the virtual reference position 26 and the synthetic offset vector 32). The length and direction of the synthetic offset vector 32 are arbitrary but the length is normally a few meters or less.

The processor 83 then uses the master synthetic vector 64, in place of the virtual vector 27, together with the master and auxiliary reference network positions and phases for the reference network stations 112A-N and the three dimensional angles to the GPS satellites 16 for inferring the synthetic reference phases that would be measured if the measurements were made at the synthetic position 133. The processor 83 passes the synthetic reference data for the virtual reference position 26 and the synthetic reference phases to the rover GPS receiver 84A. The rover GPS receiver 84A measures the phases of the same GPS signals and uses the measured rover phases, the master and auxiliary reference positions and phases with the synthetic reference phases and the virtual reference position 26 for determining the rover position 38.

FIG. 5B is a block diagram of the rover station 80B. The rover station 80B is similar to the rover station 70 described above with the exception that the rover station 80B uses the virtual reference position 26 in place of the actual reference position of the reference station 112. The rover station 80B includes a radio transceiver 82, the rover GPS receiver 84B including an anomaly detector 86B, and a secure synthetic phase processor 85. The radio transceiver 82 receives data for the virtual reference position 26 and the virtual reference phases in the radio signal 127.

The processor 85 uses the synthetic offset vector 32 (or the difference between the virtual reference position 26 and the synthetic position 133) with the virtual reference position 26, virtual reference phases and the three dimensional angles to the GPS satellites for inferring the synthetic reference phases that would be measured at the synthetic position 133. The processor 85 passes the synthetic reference data for the virtual reference position 26 and the synthetic reference phases to the rover GPS receiver 84B. The rover GPS receiver 84B measures the phases of the same GPS signals and uses the measured rover phases with the synthetic reference phases and the virtual reference position 26 for determining the rover position 38.

The rover GPS receiver 84A-B determines phase residuals from current and previous synthetic reference phases and measured rover phases and passes the phase residuals to the anomaly detector 86A-B. The anomaly detector 86A-B detects a phase residual anomaly when the phase residual is greater than a phase threshold corresponding to a selected distance or integrity limit 40 for RTK operation. The integrity limit 40 corresponds to a zone about the rover position 38. When an anomaly is detected, the anomaly detector 86A-B inhibits the rover GPS receiver 84A-B from providing the rover position 38 to the user of the rover station 80A-B, or provides a notification to the user that the anomaly was detected and allows the user to decide whether or not to use the position 38. Alternatively, the anomaly detector 86A-B provides a solution for the rover position 38 where the synthetic reference phase and measured rover phase for the particular GPS signal 14 associated with the anomaly are not used.

The position 38 calculated by the rover station 80A-B relative to the virtual reference position 26 has the added positional offset error 39 that is equal in length and in the opposite direction as the synthetic offset vector 32. Using this technique the rover station 80A-B is able to arbitrarily introduce the added error 39 into the position 38 without degrading the integrity limit 40 of the RTK positioning solution for the rover position 38.

The secure synthetic phase processors 83 and 85 perform processing on signals and data that are embedded with the boundaries of the rover stations 80A and 80B in a way that makes it physically difficult for users of the rover stations 80A and 80B to alter the processing algorithms or view the signals or data. Further, the algorithms, signals, messages and data are protected by the access controls of the Digital Millennium Copyright Act of 1998.

Figure 6B:
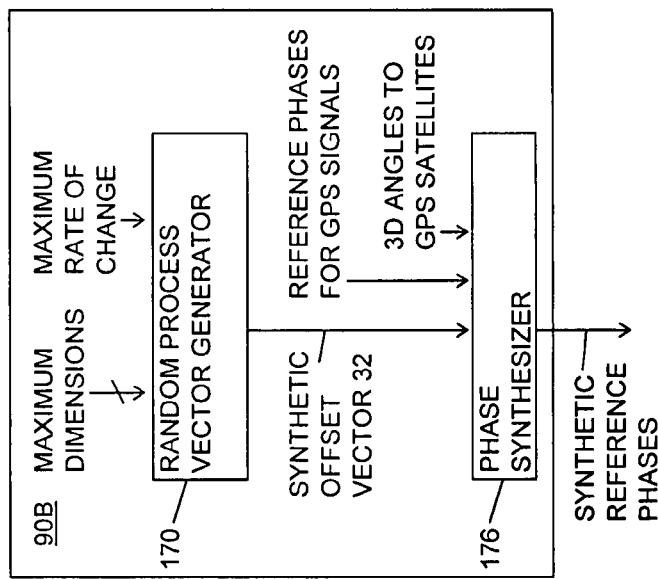
FIGS. 6A and 6B are block diagrams of first and second embodiments of random reference generators for providing synthetic reference phases.
Figure 6A:
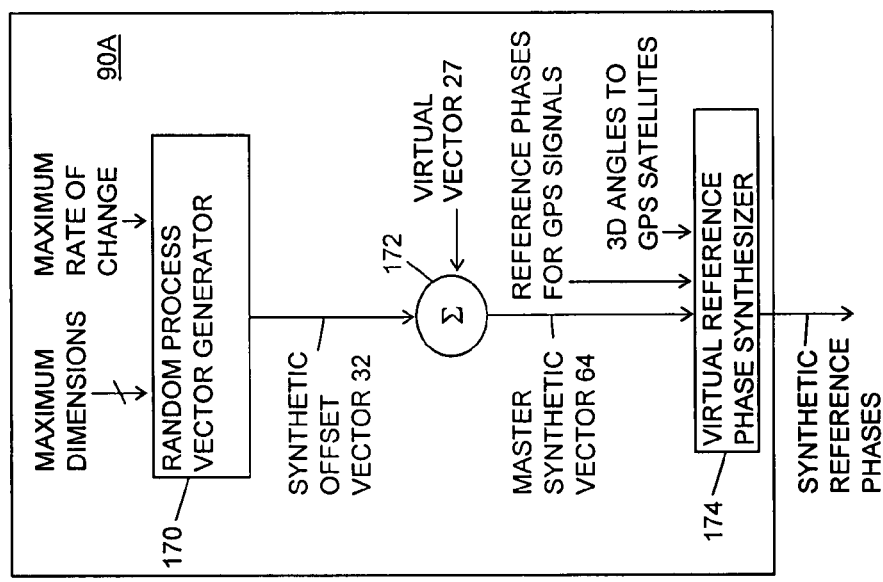

FIGS. 6A and 6B are block diagrams of random reference generators referred to by reference numbers 90A and 90B, respectively. The random reference generator 90A is used in the synthetic phase processors 63 and 83 with a VRS parametric model for generating synthetic reference phases. The random reference generator 90B is used in the synthetic phase processors 35, 65, 75 and 85 with an actual or virtual reference position for generating synthetic reference phases. The synthetic reference phases are passed from the systems 30 and 50 to the RTK GPS receivers in the rover stations 118 or 124A-C for determining the rover position 38; or computed in secure processors within the rover station 70 or 80A-B for determining the rover position 38.

The random reference generators 90A and 90B include a random process vector generator 170. The random process vector generator 170 stores or receives values for a maximum rate of change and one or more maximum dimensions and uses the values as inputs to a random or pseudo-random process for continuously computing synthetic offset vectors 32. Importantly, because the synthetic offset vectors 32 are computed with a random or nearly random process, the added error 39 is not easily reversible by users or software programming in the rover stations.

The value or values for maximum dimensions may be a maximum radius for providing a spherical error zone, a maximum radius and a maximum length for providing a cylindrical error zone, three maximum lengths X, Y and Z for providing a box error zone, or the like. The error zones refer to a volume or a three dimensional range of the added error 39 for the rover position 38 about the position for the rover station that would be determined by an RTK rover station without accuracy control. For example, the added offset 39 for the box error zone has possible errors x, y and z in three dimensions of $|x| \leq X$, $|y| \leq Y$ and $|z| \leq Z$. The box error zone need not have equal or orthogonal dimensions. The values for the maximum dimensions $z=0$ or x and $y=0$ may be used to constrain the random process vector generator 170 so that the added error 39 is confined to horizontal or vertical directions, respectively.

The added error 39 may be of relatively large magnitude but low rate of change in any direction while the rover GPS receiver, constructed for fixed RTK operation, continues to use the resolved integer number of carrier phase cycles for its positioning. By continuing to use the integers, the rover position 38 has the integrity of the RTK GPS solution within the integrity limit 40 as small as a few centimeters even when the added error 39 is a few meters or more. The RTK rover position 38 has high integrity even when the accuracy is degraded with the present invention because the errors due to multipath are largely eliminated. It will be appreciated by those skilled in the art that merely dithering the reference carrier phase measurements directly and providing the dithered reference phases to the rover station may make it impossible for an RTK rover station to resolve the carrier phase integer, thereby losing the benefit of the high integrity of the RTK position solution.

The random reference generator 90A includes a vector summer 172 and a virtual reference phase synthesizer 174. The vector summer 172 sums the synthetic offset vector 32 with the virtual vector 27 for determining the master synthetic vector 64. The virtual reference phase synthesizer 174 uses the master synthetic vector 64 with the three dimensional angles to the GPS satellites 16, and the master and auxiliary reference positions and corresponding measured master and auxiliary reference carrier phases for the GPS signals 14 for computing the synthetic reference phases. The synthetic reference phases are then used as described above with the carrier phases measured by the RTK rover GPS receiver for computing the rover position 38.

The random reference generator 90B includes a phase synthesizer 175. The phase synthesizer 175 uses the synthetic offset vector 32 from the random process vector generator 170 with a reference carrier phase and the three dimensional angles to the GPS satellites 16 to compute the synthetic reference phases for the GPS signals 14. The reference carrier phase may be an actual reference phase measured at an actual reference position or a virtual reference phase computed for the virtual reference position 26. The synthetic reference phases are then used as described above with the carrier phases measured by the RTK rover GPS receiver for computing the rover position 38.

Figure 7:
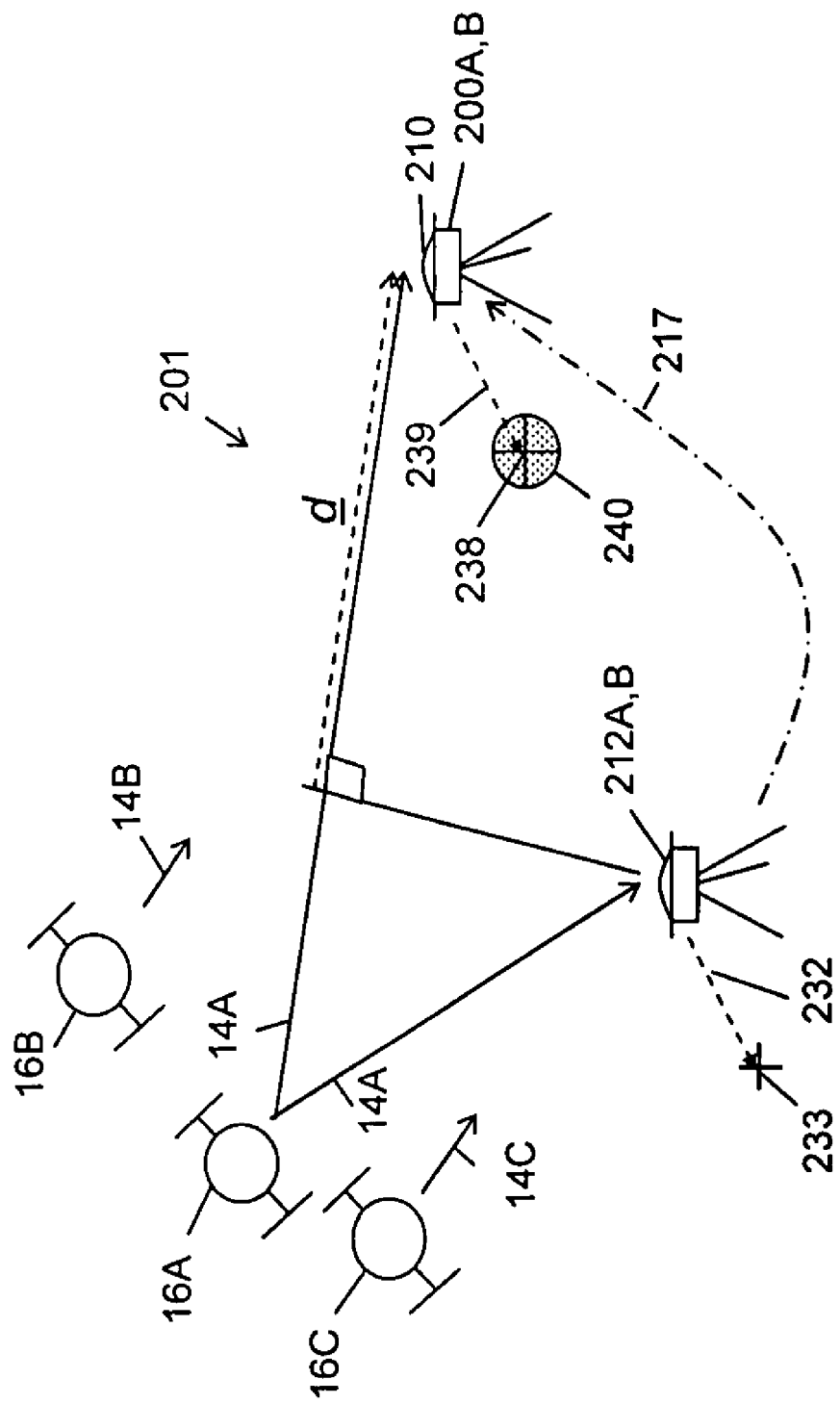
FIG. 7 is a diagram for a single reference positioning system where a secure rover station dithers a secure position for providing an unsecure position having an added positional error.

FIG. 7 is a system diagram showing a secure real time kinematic (RTK) GPS rover station 200A or 200B for operation with a reference station 212A or 212B, respectively, in a positioning system 201. The rover station 200A-B receives reference system data in a secure form from the system 201 and receives or generates a synthetic offset vector 232 with respect to the position of the reference station 212A-B. The secure reference data is used in the rover station 200A-B for computing a secure position 210. The rover station 200A-B then dithers the secure position 210 with the synthetic offset vector 232 to provide an unsecured rover position 238 having an added position error 239 to a user of the rover station 200A-B.

The vector for the added position error 239 is the same length and direction as the synthetic offset vector 232. Double difference phase residuals are monitored in the rover stations 200A-B for maintaining an integrity limit 240 for RTK operation about the secure position 210. The integrity limit 240 is an outer limit of a zone about the secure position 210. The added position error 239 offsets the secure position 210 to the unsecure position 238 without degrading the integrity limit 240 about the unsecure position 238. The integrity limit 240 may be twenty centimeters or less. The length and direction of the synthetic offset vector 232 and the added position error 239 are arbitrary but the length is normally a few meters or less.

The reference station 212A-B has a reference position that is established by a survey or some other means for receiving GPS signals 14 from GPS satellites 16 and measuring reference carrier phases. The synthetic offset vector 232 and the reference position define a synthetic position 233 of the reference station 212A-B. The reference station 212A-B sends a radio signal 217 having the secure reference data for the measured reference phases and the reference position to the rover station 200A-B. Information for the synthetic offset vector 232 may be included in the secure reference data transmitted to the rover station 200A or generated within the rover station 200B or received in the rover station 200A from some other secure source. When it is desired for the rover station 200B to operate with existing RTK GPS-based reference systems, the reference station 212B may be a conventional reference station 12 described above with the addition of security for the reference data that is transmitted to the rover station 200B.

Figure 7A:
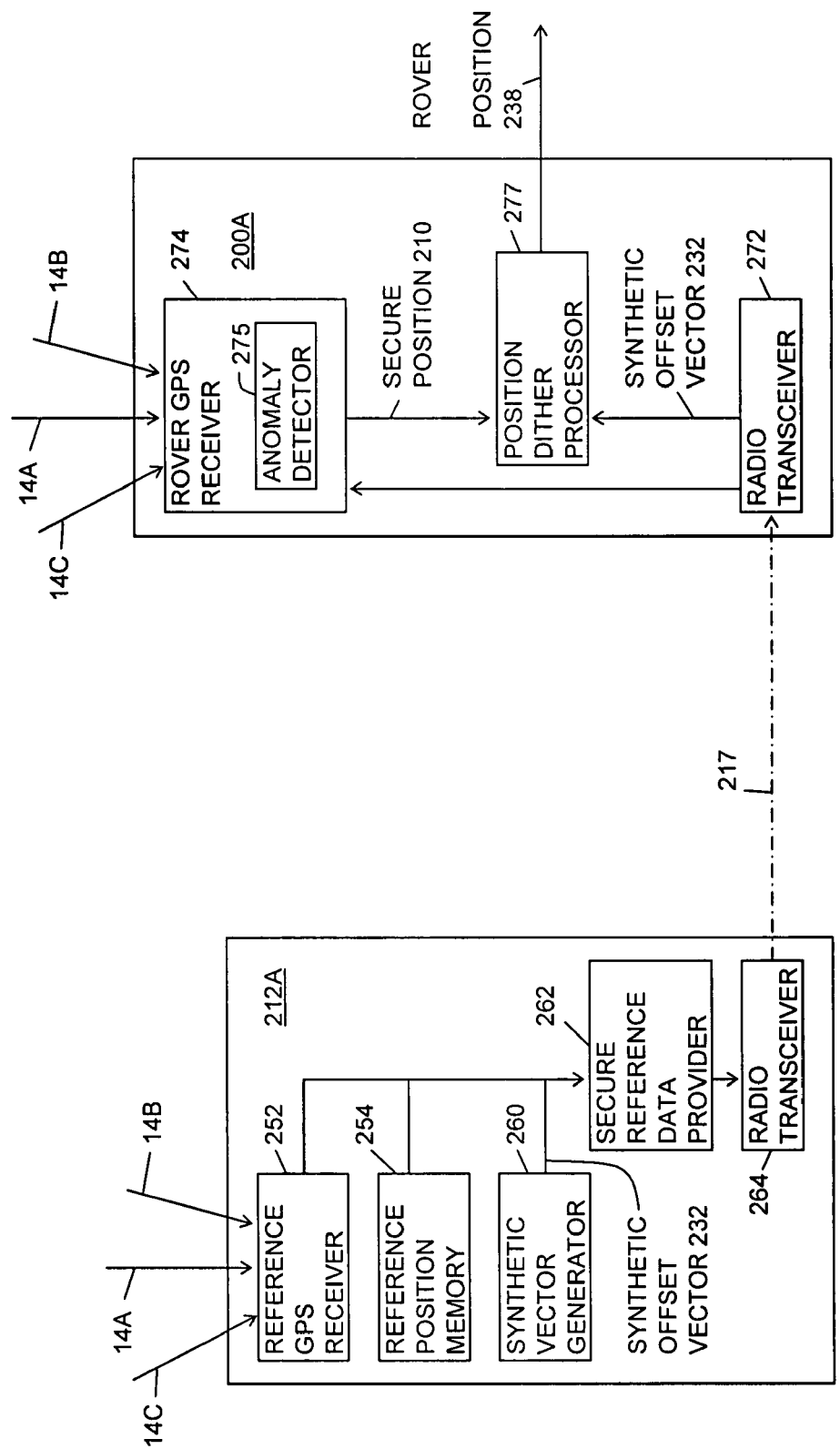
FIGS. 7A and 7B are block diagrams of first and second embodiments of the positioning system of FIG. 7.

FIG. 7A is a block diagram of an embodiment for the reference station 212A and the rover station 200A where the reference station 212A generates the synthetic offset vector 232. The reference station 212A includes a reference GPS receiver 252, a reference position memory 254, a synthetic vector generator 260, a secure reference data provider 262 and a radio transducer 264. The reference GPS receiver 252 receives and measures the carrier phases for the GPS signals 14. The reference position memory 254 stores the position of the reference station 212A. The synthetic vector generator 260 generates the synthetic offset vector 232. The secure data provider 262 processes the reference phases, reference position, and the synthetic offset vector 232 into a secure format for the reference data. The radio transceiver 264 issues the secure reference data in the radio signal 217 to the rover station 200A.

The rover station 200A includes a radio transceiver 272, an RTK rover GPS receiver 274 including an anomaly detector 275, and a position dither processor 277. The radio transceiver 272 may be replaced by a radio receiver without a transmitter if two-way communication is not required. A cellular telephone may be used for the radio transceiver 272.

The radio transceiver 272 receives the secure reference data for the synthetic offset vector 232 and a reference position and measured reference phases in the radio signal 217; and passes the reference position and phases to the GPS receiver 274 and the synthetic offset vector 232 to the position dither processor 277. The GPS receiver 274 measures the carrier phases for the GPS signals 14 for the same GPS satellites 16 and calculates the differences between the reference and rover phase measurements. The phase differences result in estimated perpendicular distance vectors represented by the vector d for the GPS signal 14A as described above for determining the secure rover position 210.

The position dither processor 277 dithers the secure rover position 210 with the synthetic offset vector 232 to provide the rover position 238 having the added position error 239. Preferably, the position dither processor 277 is a coded algorithm embedded in memory or signal processing hardware that is read or otherwise processed by the hardware and software in rover GPS receiver 274. Both the rover GPS receiver 274 and the position dither processor 277 must be secure from tampering by users of the rover station 200A in order to prevent users from undoing the accuracy control that is provided by the rover station 200A.

The rover GPS receiver 274 determines double difference phase residuals from current and previous reference phases and current and previous measured rover phases and passes the phase residuals to the anomaly detector 275. The anomaly detector 275 detects a phase residual anomaly when the phase residual is greater than a phase threshold corresponding to a selected distance for the integrity limit 240. The integrity zone about the secure position 210 is transferred by the position dither processor 277 to the integrity zone 240 about the dithered rover position 238. When an anomaly is detected, the anomaly detector 275 inhibits the position dither processor 277 from providing the rover position 238 to the user of the rover station 200, or provides a notification to the user that the anomaly was detected and allows the user to decide whether or not to use the position 238. Alternatively, the anomaly detector 275 provides a solution for the secure position 210 and the position dither processor 277 provides the rover position 238 where the reference phase and measured rover phase for the particular GPS signal 14 associated with the anomaly are not used.

Figure 7B:
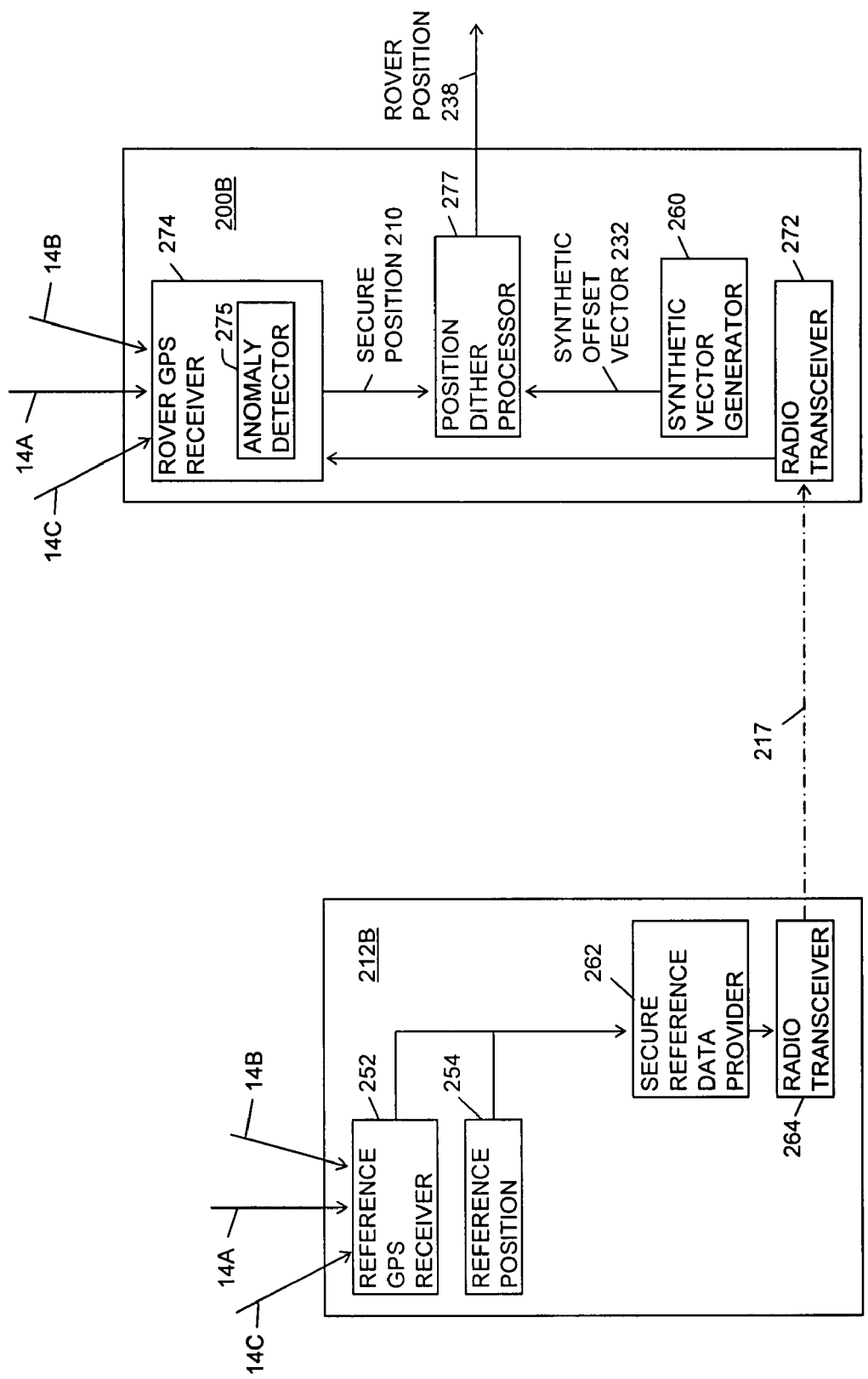

FIG. 7B is a block diagram of an embodiment for the reference station 212B and the rover station 200B where the rover station 200B generates the synthetic offset vector 232. The reference station 212B and the rover station 200B operate as described above for the reference station 212A and rover station 200A with the exception that the synthetic offset vector 232 is generated by the synthetic vector generator 260 in the rover station 200B.

Figure 8:
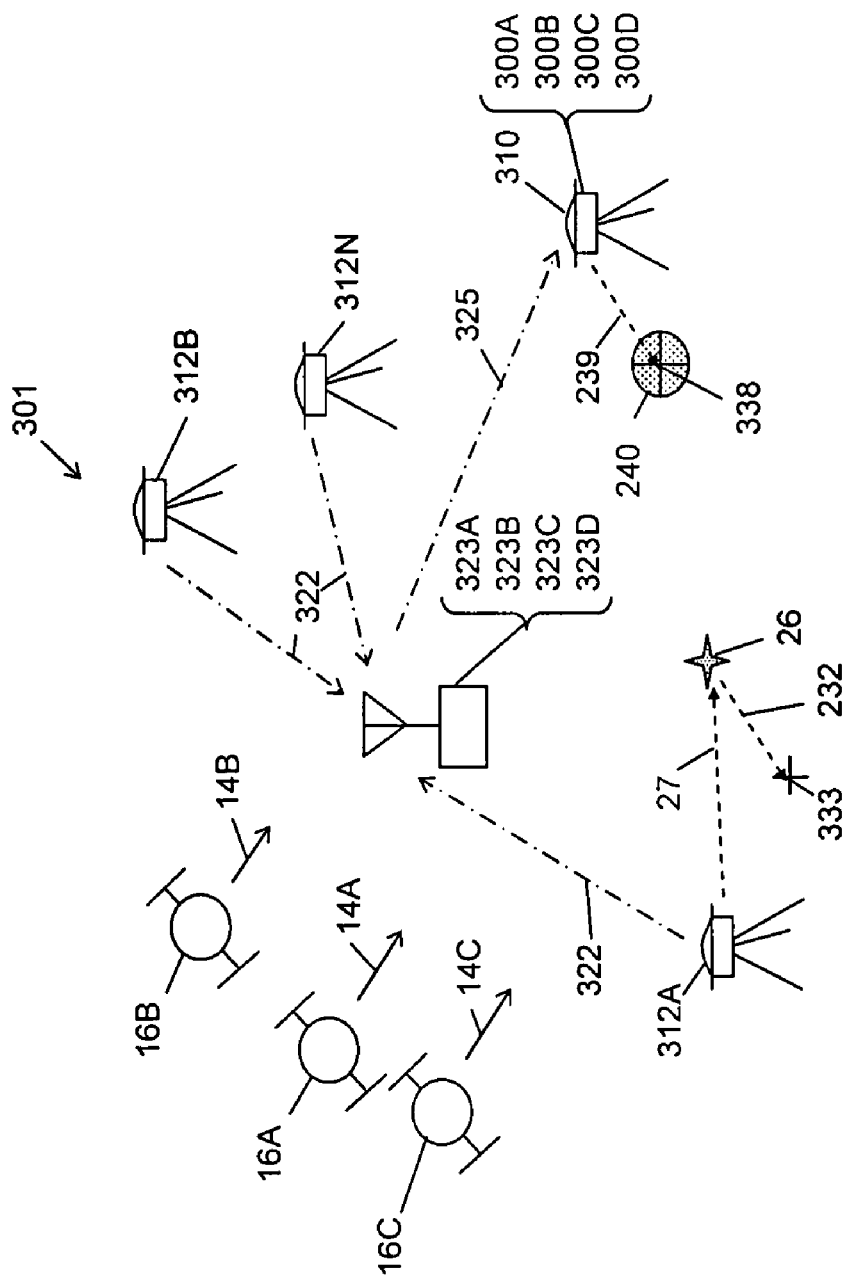
FIG. 8 is a diagram for a reference network positioning system where a secure rover station dithers a secure position for providing an unsecure position having an added position error.

FIG. 8 is a system diagram showing a secure real time kinematic (RTK) GPS rover station 300A, 300B, 300C or 300D for operation with a server 323A, 323B, 323C or 323D, respectively, in a network positioning system shown generally with a reference identifier 301. The rover station 300A-D receives the secure reference system data from the system 301 and receives or generates the synthetic offset vector 232 for controlling the positioning accuracy that it provides. The synthetic offset vector 232 offsets the virtual reference position 26 for the system 301 to a synthetic position 333. The reference data is used by the rover station 300A-D for computing a secure position 310.

The rover station 300A-D then uses the synthetic offset vector 232 to dither the secure position 310 to provide an unsecure rover position 338 having the added position error 239 to a user of the rover station 300A-D. The integrity limit 240 for RTK operation represents the outer limit of a zone about the secure position 310. The added position error 239 offsets the secure position 310 to the unsecure position 338 without degrading the integrity limit 240 so that the integrity limit 240 becomes the outer limit of a zone about the position 338. The vector for the added position error 239 is the same length and direction as the synthetic offset vector 232. The length and direction of the synthetic offset vector 232 and the added position error 239 are arbitrary but the length is normally a few meters or less.

The positioning system 301 includes a network of reference network stations, referred to as 312A, 312B through 312N, having reference positions that are known from a survey or other means. The reference stations 312A-N measure the carrier phases of the GPS signals 14 from the GPS satellites 16 and send telephone or radio signals 322 having the reference system data for the measured phases to the server 323A-D. Information for the synthetic offset vector 232 may be included in the secure reference data transmitted to the rover station 300A,C or generated within the rover station 300B,D or received in the rover station 300A,C from some other secure source. The server 323A-D communicates with a radio signal 325 to send reference data in a secure format to the rover station 300A-D. One of the reference stations, illustrated as 312A, may be designated as a master reference station and the other reference network stations 312B-N as auxiliaries.

The system 301 determines the virtual reference position 26 and the virtual vector 27 from the master reference station 312A to the virtual reference position 26. When it is desired for the rover station 300B,D to operate with existing RTK GPS-based reference systems, the server 323B,D and the reference stations 312A-N may be the server 23 and the reference stations 12A-N of the prior art with the addition of the security for the reference data transmitted to the rover station 300B,D. It should be noted that the elements of the server 323A-D do not need to be in one physical location.

Figure 8A:
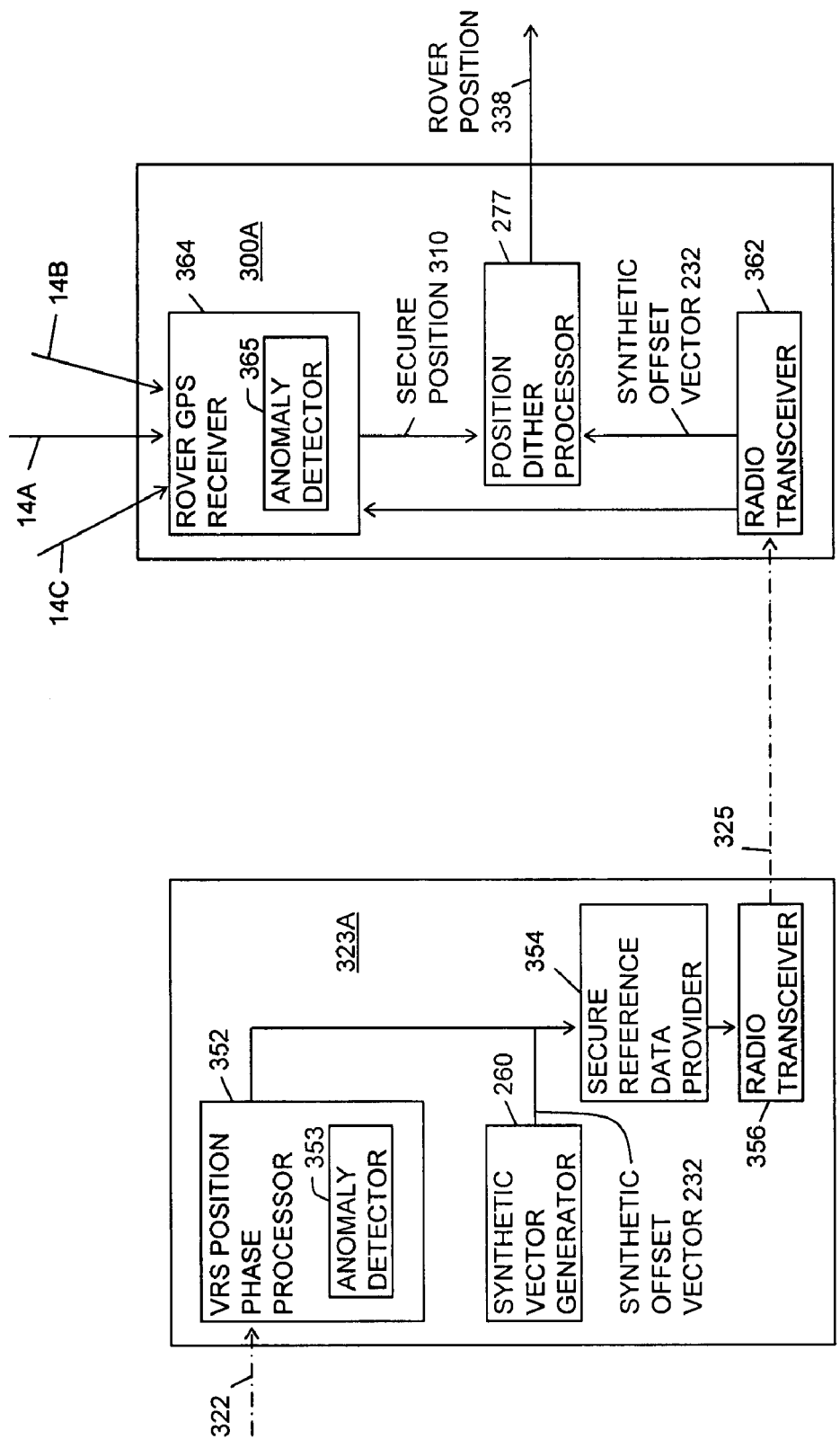
FIGS. 8A, 8B, 8C and 8D are block diagrams of first, second, third and fourth embodiments of the positioning system of FIG. 8.

FIG. 8A is a block diagram of an embodiment for the server 323A and the rover station 300A where the server 323A generates the synthetic offset vector 232. The server 323A includes the synthetic vector generator 260, a VRS position phase processor 352 including an anomaly detector 353, a secure reference data provider 354, and a radio transceiver 356. The synthetic vector generator 260 generates and passes the synthetic offset vector 232 to the secure data provider 354.

The VRS reference position phase processor 352 receives the master and auxiliary reference phases from the reference stations 312A-N in the signal 322. The master and auxiliary reference positions are retained by the processor 352 or are received in the signal 322. The processor 352 uses the virtual reference position 26 with the master and auxiliary positions and phases from the reference stations 312A-N for determining virtual reference phases for the GPS signals 14 referred to the virtual reference position 26 and passes the reference data for the virtual reference position 26 and the virtual reference phases to the secure data provider 354. The anomaly detector 353 monitors double difference phase residuals between the current and previous measured phases between the reference stations 312A-N for preventing the reference data from being used by the rover station 300A when one of the current reference phases is outside a phase residual threshold corresponding to the integrity limit 240.

The secure data provider 354 processes the reference data into a secure format and passes the secure reference data to the radio transceiver 356. The radio transceiver 356 issues the secure reference data in the radio signal 325 to the rover station 300A. The rover station 300A includes the position dither processor 277, a radio transceiver 362, and a rover RTK GPS receiver 364 including an anomaly detector 365. The radio transceiver 362 receives secure reference data in the radio signal 325 and passes the reference system position and phase data to the rover GPS receiver 364 and the synthetic offset vector 232 to the position dither processor 277. The radio transceiver 362 may be a radio receiver without a transmitter if two-way communication is not required. The radio transceiver 362 may be a cellular telephone.

The rover GPS receiver 364 measures carrier phases for the GPS signals 14 for the same GPS satellites 16 as the reference GPS receiver 352 and then uses the reference system position and phase data for correcting the carrier phases that it measures and ultimately arrives at the secure position 310 with respect to the virtual reference position 26.

The rover GPS receiver 364 determines phase residuals from current and previous reference phases and measured rover phases and passes the phase residuals to the anomaly detector 365. The anomaly detector 365 detects a phase residual anomaly when the phase residual is greater than a phase threshold corresponding to a selected integrity limit 240. The integrity limit 240 corresponds to a zone about the rover position 310. The position dither processor 277 dithers the secure position 310 with the synthetic offset vector 232 for transferring the integrity limit 240 to the unsecure position 338 having the added error 239. When an anomaly is detected, the anomaly detector 365 inhibits the rover GPS receiver 364 from providing the rover secure position 310 to the position dither processor 277 and ultimately inhibits the rover station 300A from providing the rover position 338 to the user of the rover station 300A. Alternatively, the anomaly detector 365 provides the position 338 where the measured reference and rover phases for the particular GPS signal 14 associated with the anomaly are not used.

Figure 8B:
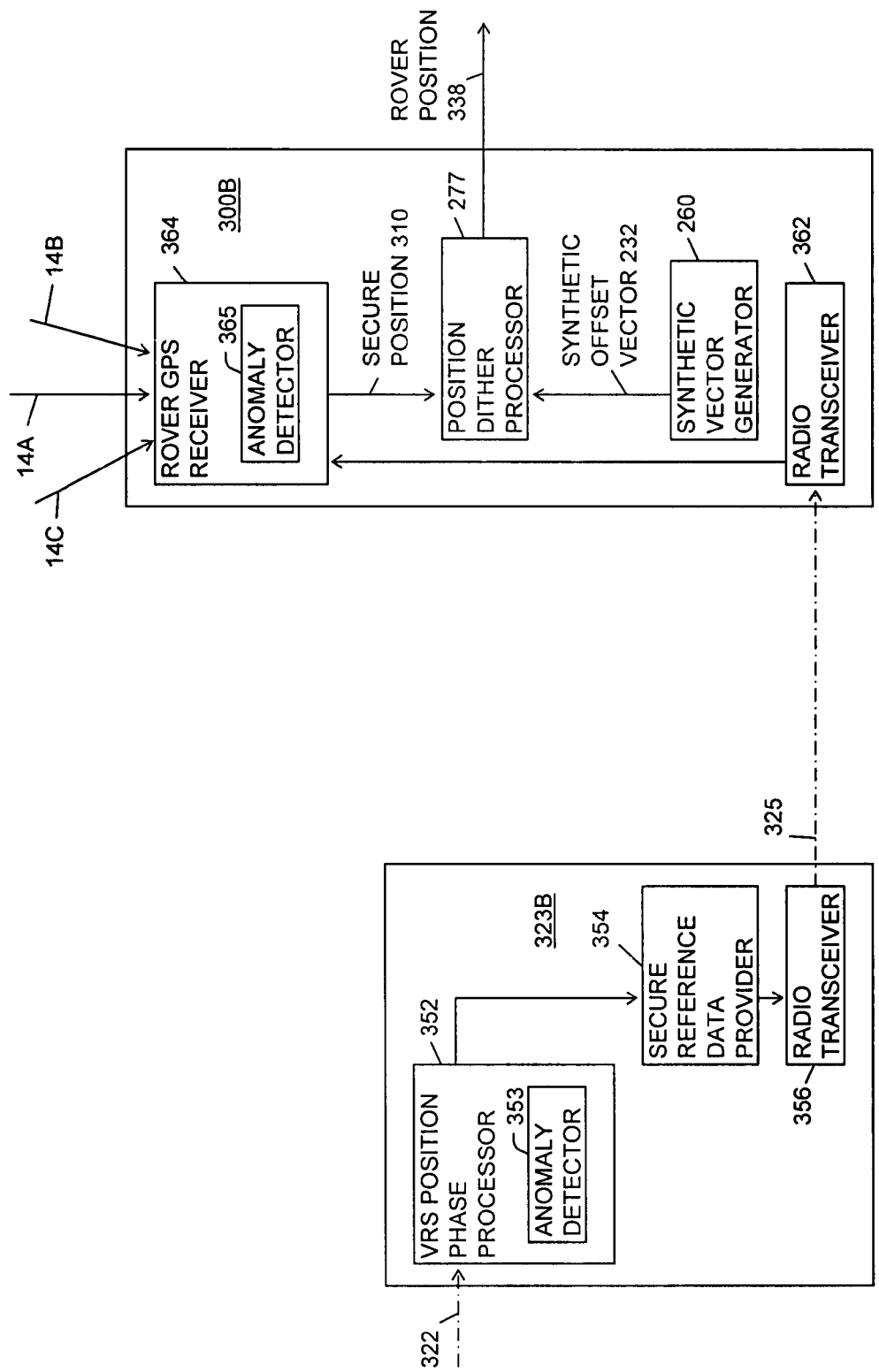

FIG. 8B is a block diagram of an embodiment for the server 323B and the rover station 300B where the rover station 300B generates the synthetic offset vector 232. The server 323B includes the VRS position phase processor 352 including the anomaly detector 353, the secure data provider 354, and the radio transceiver 356 as described above. The rover station 300B includes the synthetic vector generator 260, the position dither processor 277, the radio transceiver 362, and the rover RTK GPS receiver 364 including the anomaly detector 365 as described above.

The radio transceiver 356 transmits the reference system data for the virtual reference position 26 and the virtual reference phases in a secure format in the radio signal 325 to the rover station 300B. The synthetic vector generator 260 in the rover station 300B passes the synthetic offset vector 232 to the position dither processor 277. The position dither processor 277 dithers the secure position 310 with the synthetic offset vector 232 to provide the unsecure rover position 338 having the integrity limit 240 to the user of the rover station 300B.

Figure 8C:
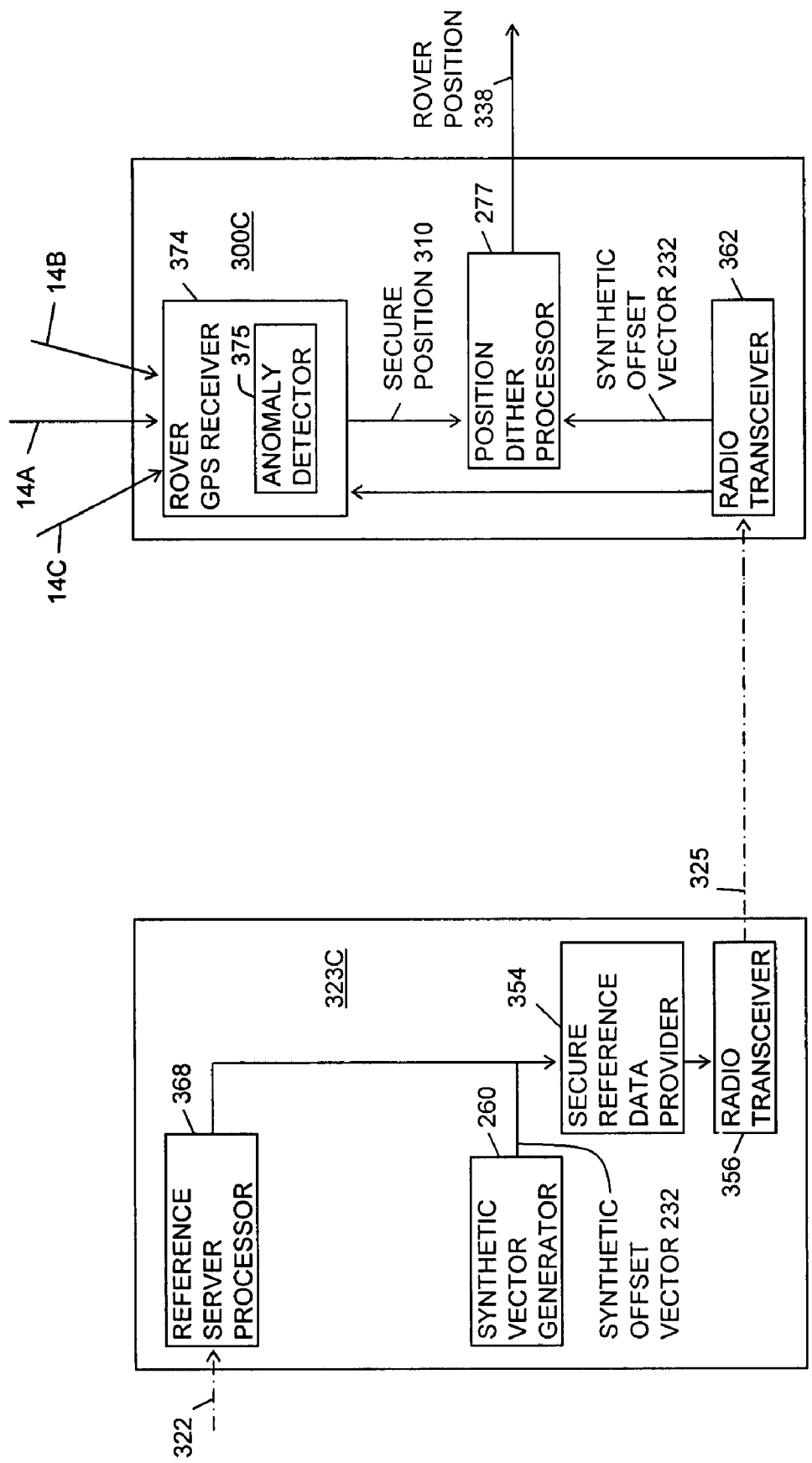

FIG. 8C is a block diagram of an embodiment for the server 323C and the rover station 300C where the server 323C generates the synthetic offset vector 232. The server 323C includes the synthetic vector generator 260, a reference server processor 368, the secure data provider 354, and the radio transceiver 356. The synthetic vector generator 260 generates and passes the synthetic offset vector 232 to the secure data provider 354.

The reference server processor 368 receives the master and auxiliary reference phases from the reference stations 312A-N in the signal 322. The master and auxiliary reference positions are retained by the processor 368 or are received in the signal 322. The processor 368 passes the master and auxiliary reference positions and phases to the secure data provider 354.

The secure data provider 354 processes the reference data into a secure format and passes the secure reference data to the radio transceiver 356. The radio transceiver 356 issues the secure reference data in the radio signal 325 to the rover station 300C. The rover station 300C includes the position dither processor 277, the radio transceiver 362, and a rover RTK GPS receiver 374 including an anomaly detector 375. The radio transceiver 362 receives secure reference data in the radio signal 325 and passes the reference system position and phase data to the rover GPS receiver 374 and the synthetic offset vector 232 to the position dither processor 277. The radio transceiver 362 may be a radio receiver without a transmitter if two-way communication is not required. The radio transceiver 362 may be a cellular telephone.

The rover GPS receiver 374 measures carrier phases for the GPS signals 14 for the same GPS satellites 16 as the reference stations 312A-N and then uses the reference system position and phase data for correcting the carrier phases that it measures and ultimate arrives at the secure position 310 with respect to the virtual reference position 26. The secure position 310 is passed to the position dither processor 277.

The rover GPS receiver 374 determines phase residuals from current and previous reference phases and measured rover phases and passes the phase residuals to the anomaly detector 375. The anomaly detector 375 detects a phase residual anomaly when the phase residual is greater than a phase threshold corresponding to a selected integrity limit 240. The integrity limit 240 corresponds to the outer limit of a zone about the rover position 310. The position dither processor 277 dithers the secure position 310 with the synthetic offset vector 232 for transferring the integrity limit 240 to the unsecure rover position 338 having the added position error 239 with respect to the virtual reference position 26. When an anomaly is detected, the anomaly detector 375 inhibits the rover GPS receiver 374 from providing the rover secure position 310 to the position dither processor 277 and ultimately inhibits the rover station 300C from providing the rover position 338 to the user of the rover station 300C. Alternatively, the anomaly detector 375 provides a solution for the rover position 338 where the reference phase and measured rover phase for the particular GPS signal 14 associated with the anomaly are not used.

Figure 8D:
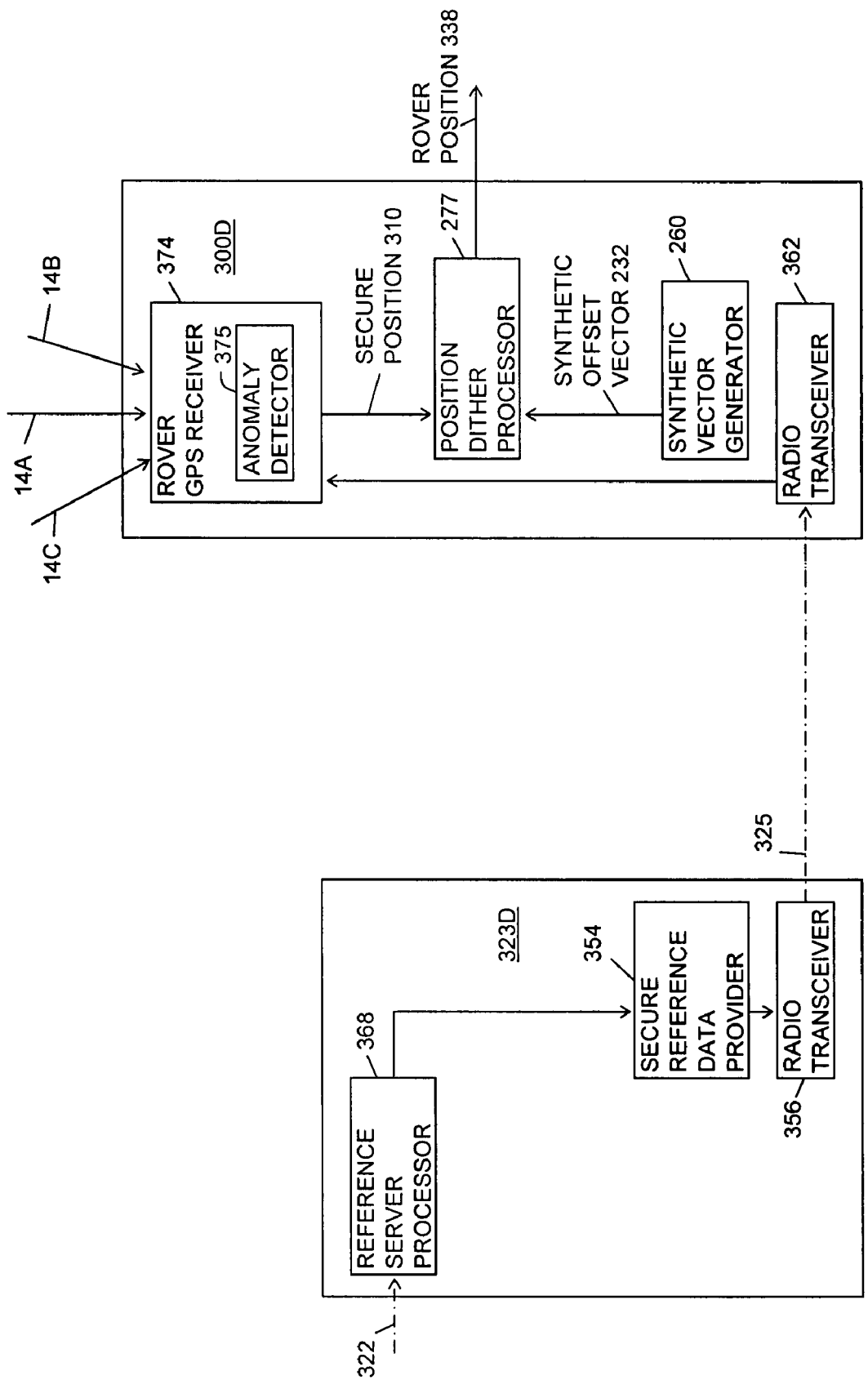

FIG. 8D is a block diagram of an embodiment for the server 323D and the rover station 300D where the rover station 300D generates the synthetic offset vector 232. The server 323D includes the reference server processor 368, the secure data provider 354, and the radio transceiver 356 as described above. The rover station 300D includes the synthetic vector generator 260, the position dither processor 277, the radio transceiver 362, and the rover RTK GPS receiver 374 including the anomaly detector 375, as described above.

The radio transceiver 356 transmits the reference system data for the master and auxiliary reference positions and phases (or difference between the master and auxiliary positions and phases) in a secure format in the radio signal 325 to the rover station 300D. The synthetic vector generator 260 in the rover station 300D generates and passes the synthetic offset vector 232 to the position dither processor 277. The position dither processor 277 dithers the secure position 310 with the synthetic offset vector 232 to provide the unsecure rover position 338 to the user of the rover station 300D.

Using these techniques the secure rover station 200A-B, 300A-D is able to introduce the arbitrary added error 239 into the position 238,338 that is provided by the rover station 200A-B,300A-D without degrading the integrity limit 240 that is computed for the secure position 210,310. The reference data must be secure and both the rover GPS receiver 274,364,374 and the position dither processor 277 must be secure from tampering by users in order to prevent users from undoing the accuracy control that is provided by the rover station 200A-B,300A-D.

Anomaly detectors, such as 63A, 66A, 74A, 86A-B, 120, 126A-C, 275, 353, 365 and 375, are described above for detecting anomalies (also known as outliers) for phase residuals on a satellite-by-satellite basis for real time kinematic (RTK) position determinations. The anomaly is detected when the phase residual exceeds a selected phase residual limit. The phase residual limit is selected so that when the phase residuals are within the phase residual limit, the position determination has the designated integrity limit 40,240.

The algorithms, signals, messages and data in the rover GPS receiver 274,364,374, the position dither processor 277, and the reference data in the signals 127, 217 and 325 are provided with the access control measures of the Digital Millennium Copyright Act of 1998. The reference data in the signals 127, 217 and 325 may also be protected by encryption. The rovers 200A-B and 300A-D perform processing on signals and data that are embedded with the boundaries of the rovers 200A-B and 300A-D in a way that makes it mechanically or electrically difficult for an unauthorized user of the rovers 200A-B and 300A-D to alter the algorithms or view the signals or data. All users are unauthorized users unless they are designated by the provider of the algorithms, signals or data as authorized users.

It may be noted that the positioning system 30, 50, 71, 81, 201 or 301 could be used as the basis for a fee-based RTK GPS service wherein the price for the service is based upon the accuracy of the positioning.

Figure 9:
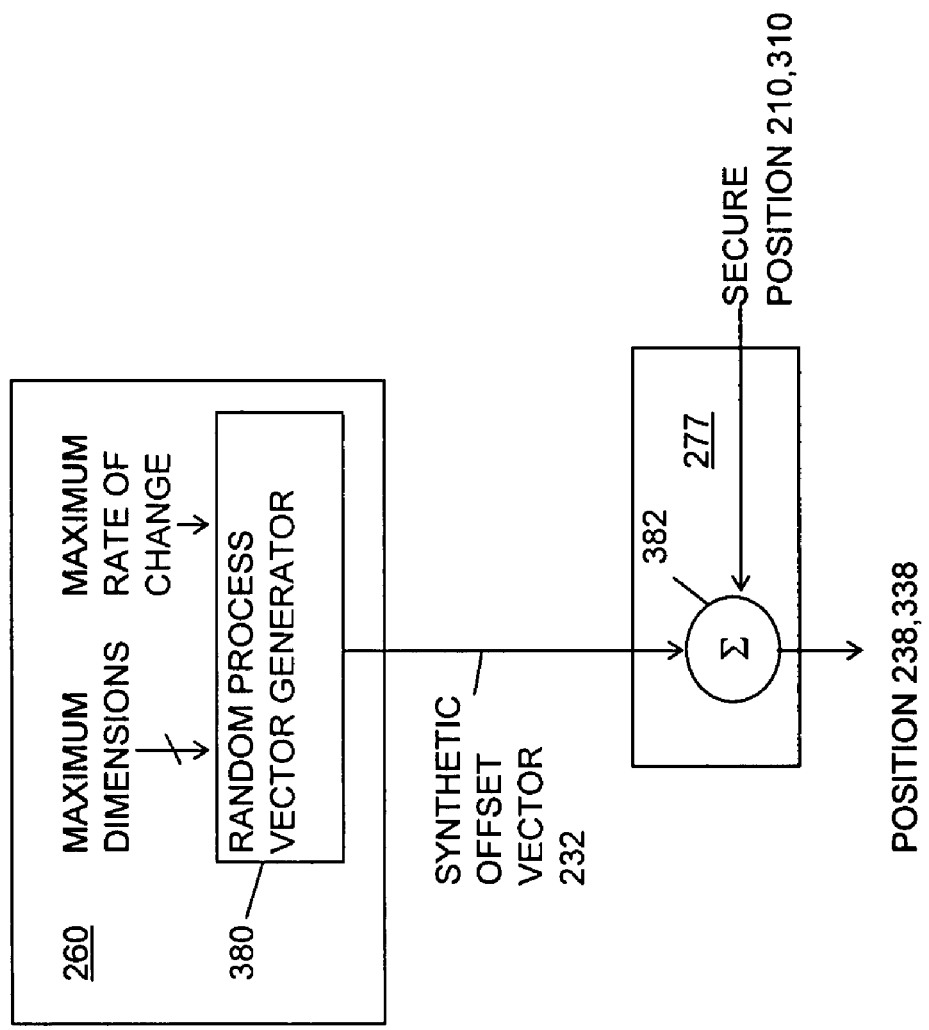
FIG. 9 is a block diagram of a random position dither processor for the systems of FIGS. 7 and 8.

FIG. 9 is a block diagram illustrating the synthetic vector generator 260 and the position dither processor 277. The synthetic vector generator 260 includes a random process vector generator 380. The random process vector generator 380 stores or receives values for a maximum rate of change and one or more maximum dimensions and uses the values as inputs to a random or pseudo-random process for continuously computing the synthetic offset vector 232. The position dither processor 277 includes a summer 382 for summing the synthetic offset vector 232 with the secure position 210, 310. Importantly, because the synthetic offset vector 232 is the same as the added positional error 239 and the synthetic offset vector 232 is computed with a random or nearly random process, the added positional error 239 is not easily reversible by unauthorized users.

The value or values for maximum dimensions may be a maximum radius value for providing a spherical error zone, a maximum radius and a maximum length for providing a cylindrical error zone, three maximum lengths X, Y and Z for providing a box error zone, or the like. The error zones refer to a volume or a three dimensional range of the added position error 239 for the dithered (unsecure) rover position 238,338 about the secure rover position 210,310. For example, the added error positional error 239 for the box error zone has possible errors x, y and z in three dimensions of $|x| \leq X$, $|y| \leq Y$ and $|z| \leq Z$. The box error zone need not have equal or orthogonal dimensions. The values for the maximum dimensions z=0 or x and y=0 may be used to constrain the random process vector generator 380 so that the added position error 239 is confined to horizontal or vertical directions, respectively.

The added error 239 may be of relatively large magnitude in any direction while the rover GPS receiver, constructed for fixed RTK operation, continues to use the resolved integer number of carrier phase cycles for its positioning. By continuing to resolve the integers, the rover position 238,338 has the integrity of the RTK GPS solution within the integrity limit 240 as small as a few centimeters even when the added error 239 is a few meters or more. The RTK rover position 238,338 has high integrity when the accuracy is degraded because the errors due to multipath are largely eliminated. It will be appreciated by those skilled in the art that merely dithering the reference position directly and providing the dithered reference position to the rover could make it impossible for an RTK rover station to resolve the carrier phase integer, thereby losing the benefit of the high integrity of the RTK position solution.

Figure 10:
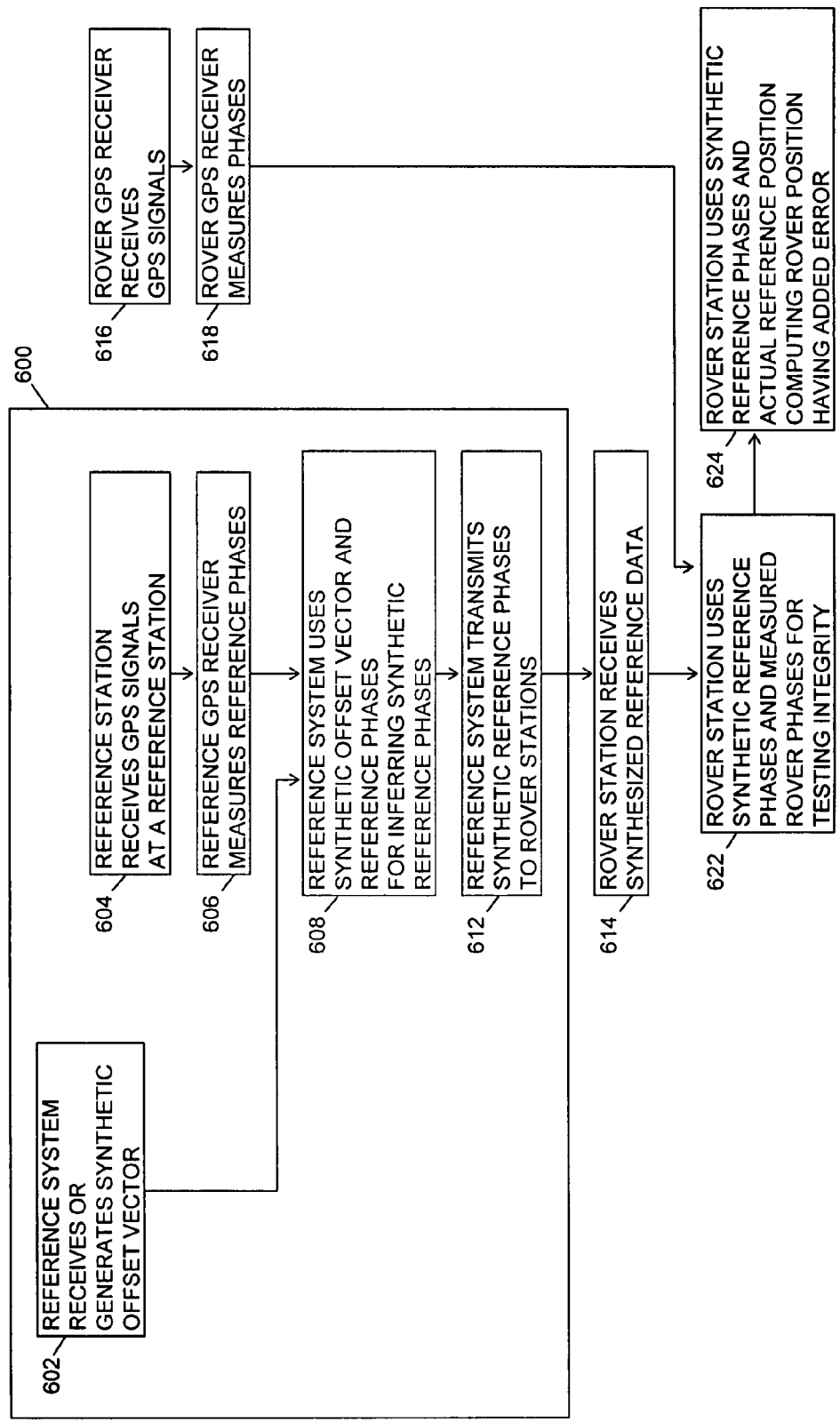
FIG. 10 is a flow chart of a method for providing synthetic reference phases from a single reference positioning system to a rover station.

FIG. 10 is a flow chart of steps of a method for providing the synthetic reference phases from the reference system 30 having one reference station to one or more rover stations. The steps may be embodied in a tangible medium 600 containing instructions that may be read by a processor or processors for causing the system to carry out the steps. The medium 600 may be constructed with one or more memory devices such as compact disks, electronic memory chips, hard disks, digital video devices, or the like. The processor may be a device commonly known as a computer or a microprocessor.

A synthetic offset vector is received or generated or otherwise selected in a step 602. In a step 604, GPS signals are received at the reference station by a real time kinematic (RTK) GPS receiver. In a step 606 the reference GPS receiver measures carrier phases of the GPS signals at a reference position.

A synthetic position is defined by the reference position and the synthetic offset vector. In a step 608 the reference system uses the synthetic offset vector and the measured reference phases for determining synthetic reference phases for the GPS signals that would be received at the synthetic position. In a step 612 the reference system transmits synthesized reference data that includes the synthetic reference phases to the rover station.

A GPS rover station having an RTK GPS receiver receives the synthesized reference data in a step 614. In a step 616 the rover GPS receiver receives the GPS signals from the same GPS satellites. In a step 618 the rover GPS receiver measures the carrier phases of the same GPS signals. In a step 622, the synthetic reference phases and the measured rover phases are used for testing the integrity of the phase measurements. In a step 624, when integrity has been verified, the rover station uses the reference position, the synthetic reference phases and the rover phases for determining its position. The position that is determined by the rover station has the same RTK integrity as if it were determined with the phases for the reference position but with an added offset error, unknown to the rover station, equal in length to the synthetic offset vector.

Figure 11:
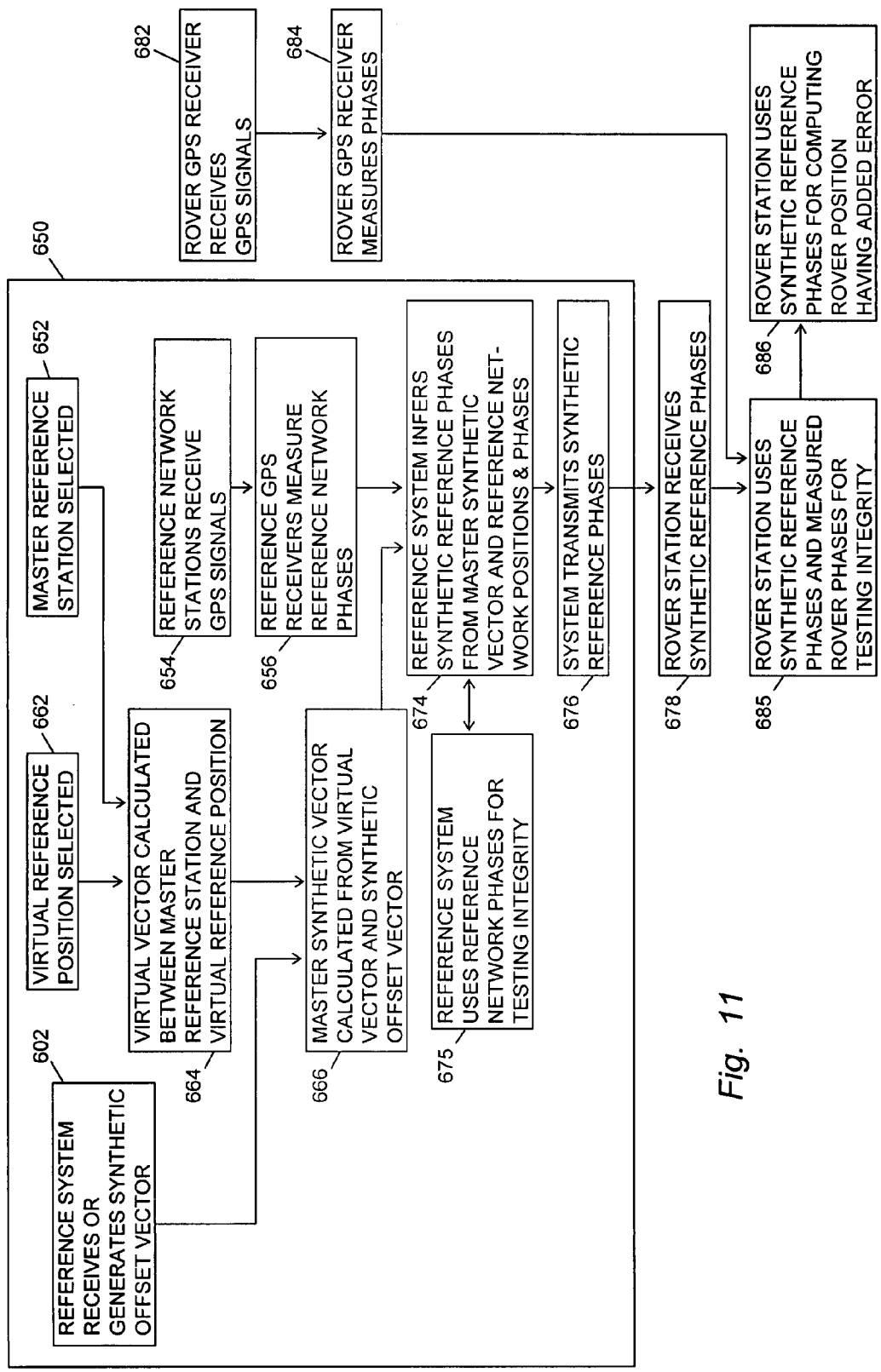
FIG. 11 is a flow chart of a method for providing synthetic reference phases from a reference network positioning system to a rover station.

FIG. 11 is a flow chart of steps of a method for providing the synthetic reference phases from a reference network system, such as the reference network system 50, to one or more rover stations. The steps may be embodied in a tangible medium 650 containing instructions that may be read by a processor or processors for causing the system to carry out the steps. The medium 650 may be constructed with one or more memory devices such as compact disks, electronic memory chips, hard disks, digital video devices, or the like. The processor may be a device commonly known as a computer or a microprocessor.

A synthetic offset vector is received or generated or otherwise selected in the step 602. In a step 652 one of the network of reference stations is designated as the master reference station. In a step 654 GPS signals are received at the reference network stations. In a step 656 the real time kinematic (RTK) GPS receivers at the reference stations measure reference network phases for the carriers of the GPS signals at reference network positions.

A virtual reference position is selected by the system or negotiated between the system and the rover station in a step 662. In a step 664 a virtual vector is calculated between the position of the master reference station and the virtual reference position. In a step 666 a master synthetic vector is calculated by adding the virtual vector and the synthetic offset vector. A synthetic position is defined by the virtual reference position and the synthetic offset vector or equivalently by the position of the master reference station and the master synthetic vector. In a step 674 the system uses the master synthetic vector, the reference network positions and the measured reference network phases for mathematically determining the synthetic reference phases that would be measured for GPS signals received at the synthetic position. In a step 675 the reference system uses double difference phase residuals of the master and auxiliary reference phases for testing integrity. In a step 676 when the integrity of the reference phases has been determined, the system transmits synthesized reference data including the synthetic reference phases. In a step 678 the rover station receives the synthetic reference data.

A GPS rover station having a real time kinematic (RTK) GPS receiver receives the GPS signals from the same GPS satellites in a step 682. In a step 684 the rover GPS receiver measures the carrier phases of the GPS signals. In a step 685, the synthetic reference phases and the measured rover phases are used for testing the integrity of the phase measurements. In a step 686, when integrity has been verified, the rover station uses the synthetic reference phases for determining its position. The accuracy of the position that is determined by the rover station has the same integrity as if it were determined in an RTK solution with the phases for virtual reference position but with an added offset error, unknown to the rover station, equal in length to the synthetic offset vector.

Figure 12:
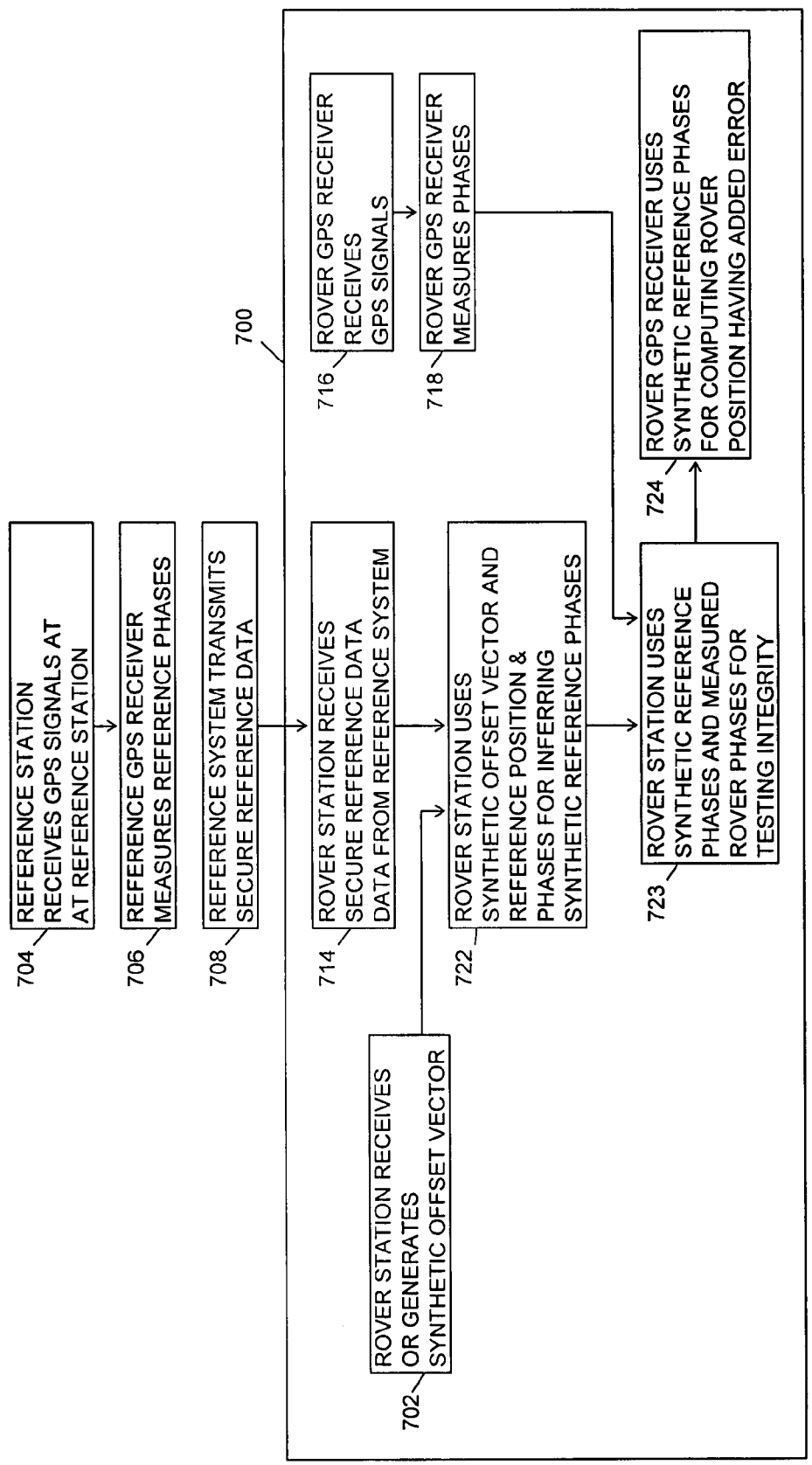
FIG. 12 is a flow chart of a method for computing synthetic reference phases in a rover station operating in a single reference positioning system.

FIG. 12 is a flow chart of steps of a method for computing synthetic reference phases in a rover station, such as the rover station 70, and then using the synthetic reference phases for computing a rover position having an added error. The steps may be embodied in a tangible medium 700 containing instructions that may be read by a processor or processors for causing the rover station to carry out the steps. The medium 700 may be constructed with one or more memory devices such as compact disks, electronic memory chips, hard disks, digital video devices, or the like. The processor may be a device commonly known as a computer or a microprocessor.

A synthetic offset vector is received or generated or otherwise selected in a secure synthetic phase processor in the rover station in a step 702. In a step 704, GPS signals are received at a reference position by a real time kinematic (RTK) GPS receiver in a GPS reference station. A synthetic position is defined by the reference position and the synthetic offset vector. In a step 706 the reference GPS receiver measures carrier phases of the GPS signals. In a step 708 the reference system transmits a signal having secure reference data that includes the reference position and measured reference phases.

The rover GPS receiver receives the secure reference data from the system in a step 714. In a step 716 the rover GPS receiver receives the GPS signals from the same GPS satellites. In a step 718 the rover GPS receiver measures the carrier phases of the GPS signals. In a step 722 the rover station uses the reference position and phases and the synthetic offset vector for inferring the synthetic reference phases for the GPS signals that would be received at the synthetic position. In a step 723, the synthetic reference phases and the measured rover phases are used for testing the integrity of the phase measurements. In a step 724, when integrity has been verified, the rover GPS receiver uses the reference position, the synthetic reference phases and the measured rover phases for determining its position. The accuracy of the position that is determined by the rover station has the same RTK integrity as if it were determined with the true reference phases but with an added offset error, unknown to the rover station, equal in length to the synthetic offset vector.

Figure 13:
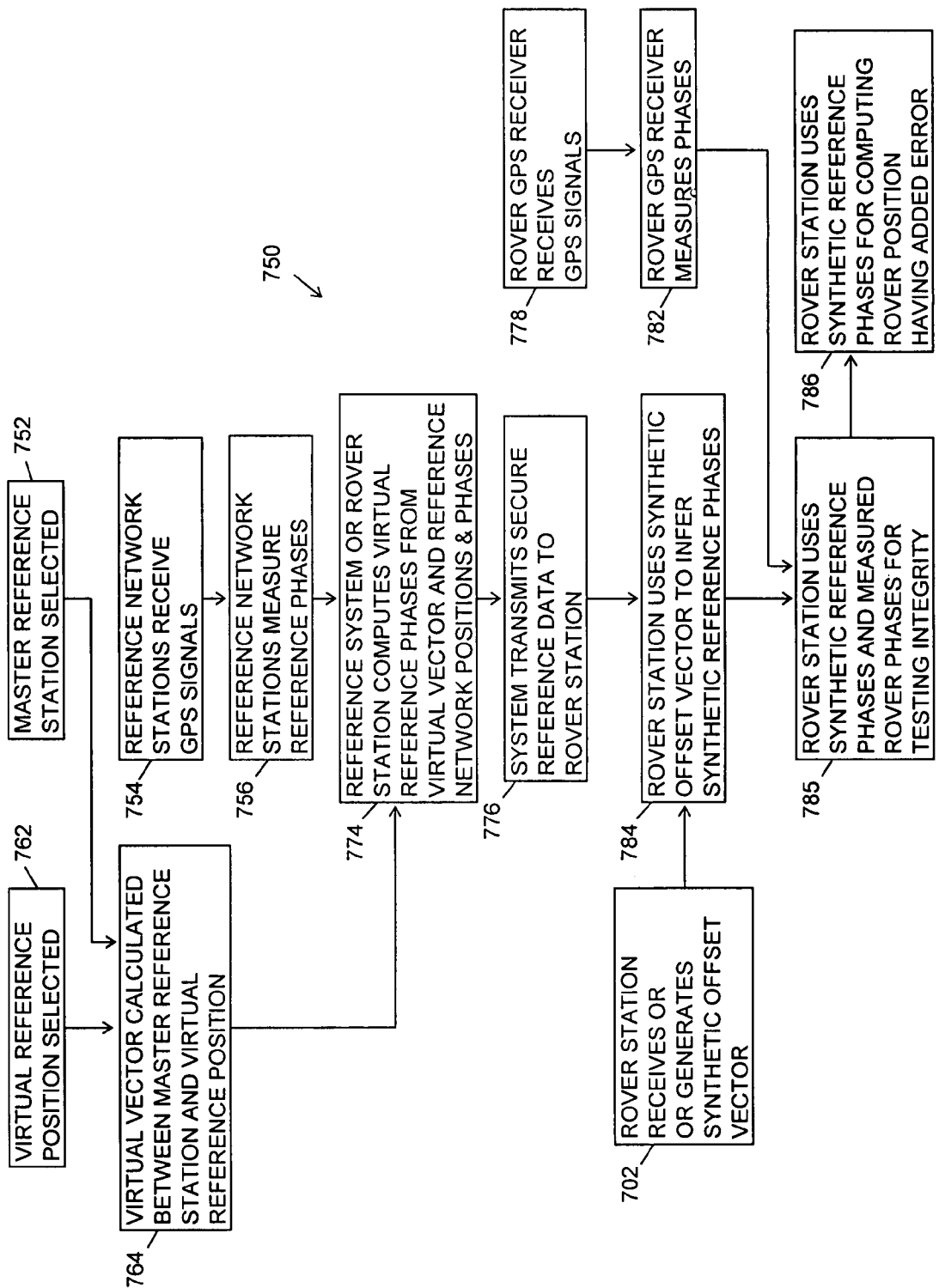
FIG. 13 is a flow chart of a method for computing synthetic reference phases in a rover station operating in a reference network positioning system.

FIG. 13 is a flow chart of steps of a method for computing synthetic reference phases in a rover station such as the rover station 80A or 80B, and then using the synthetic reference phases for computing a rover position having an added error. The steps may be embodied in a tangible medium 750 containing instructions that may be read by a processor or processors for causing the rover station to carry out the steps. The medium 750 may be constructed with one or more memory devices such as compact disks, electronic memory chips, hard disks, such as digital video devices, or the like. The processor may be a device commonly known as a computer or a microprocessor.

A synthetic offset vector is received or generated or otherwise selected in a secure phase processor in the rover station in the step 702. In a step 752 one of a network of reference stations is selected or designated as the master reference station. In a step 754 GPS signals are received by real time kinematic (RTK) GPS receivers at GPS reference network stations. In a step 756 the reference GPS receivers measure reference network phases for the carriers of the GPS signals.

A virtual reference position is selected by the system or negotiated between the system and the rover station in a step 762. In a step 764 a virtual vector is calculated from the position of the master reference station to the virtual reference position. A synthetic position is defined by the virtual reference position and the synthetic offset vector. In a step 774 the system or the rover station computes virtual reference phases from the virtual reference vector and the reference network positions and phases. In a step 776 the system transmits secure reference data having the measured master and auxiliary reference positions and phases or the virtual reference position and phases to the rover station.

The rover GPS receiver receives the GPS signals from the same GPS satellites in a step 778. In a step 782 the rover GPS receiver measures the carrier phases of the GPS signals. In a step 784 the rover station uses the synthetic offset vector directly or indirectly through the master synthetic vector (calculated by adding the virtual vector and the synthetic offset vector), and the virtual reference position and phases or the master and auxiliary positions and phases for computing the synthetic reference phases for the synthetic position. In a step 785, the synthetic reference phases and the measured rover phases are used for testing the integrity of the phase measurements. In a step 786, when integrity has been verified, the rover GPS receiver uses the virtual reference position and phases and the synthetic reference phases for determining a position. The accuracy of the position that is determined by the rover station has the same RTK integrity as if it were determined for the virtual reference phases but with an added offset error, unknown to the rover station, equal in length to the synthetic offset vector.

Figure 14:
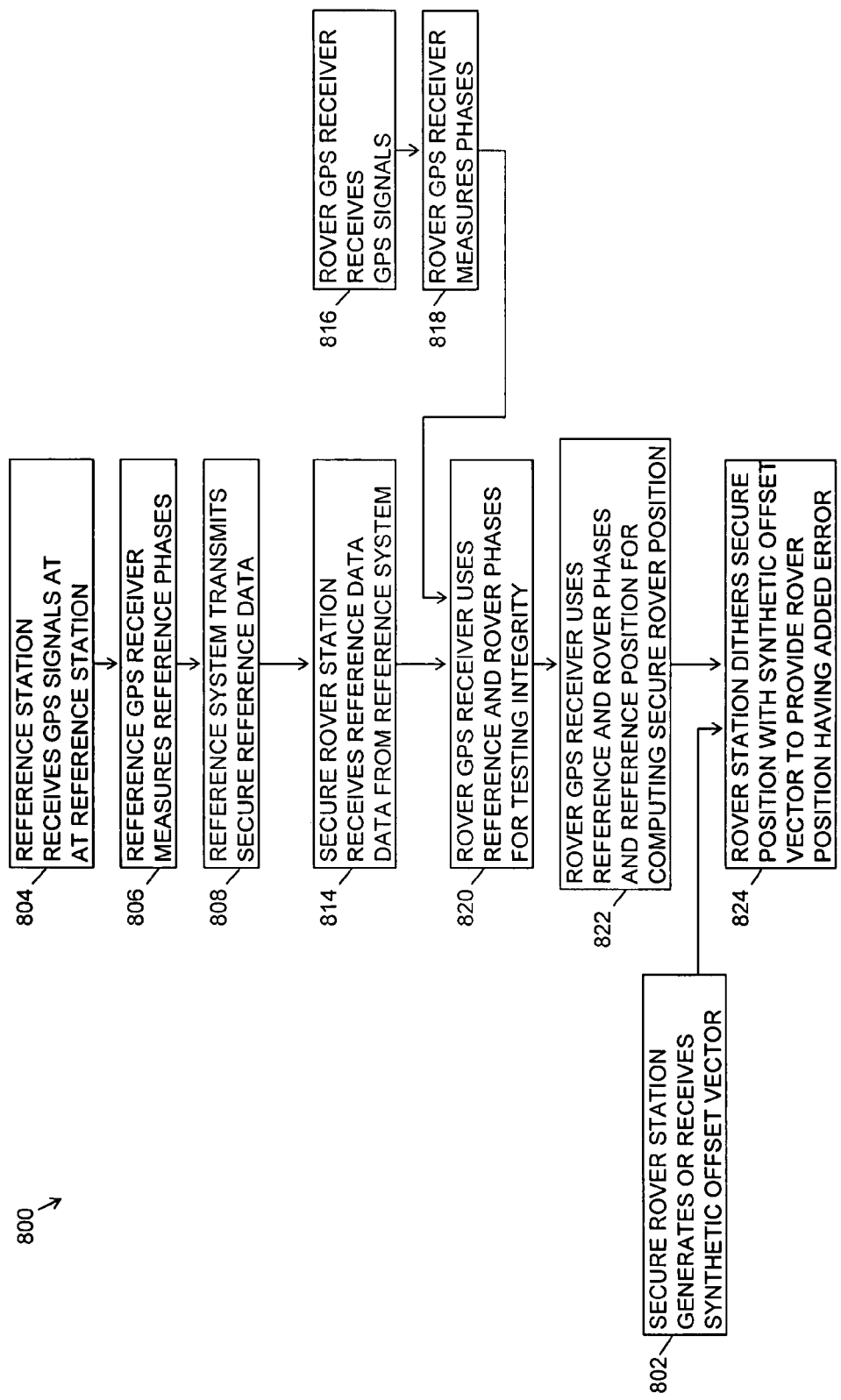
FIG. 14 is a flow chart of the method for dithering a secure rover position for providing an added error to a rover position in a single reference positioning system.

FIG. 14 is a flow chart of steps of a method for adding an error, shown and described above as the added error 239, to a rover position. The steps may be embodied in a tangible medium 800 containing instructions that may be read by a processor or processors for causing the rover station to carry out the steps. The medium 800 may be constructed with one or more memory devices such as compact disks, electronic memory chips, hard disks, digital video devices, or the like. The processor may be a device commonly known as a computer or a microprocessor.

A synthetic offset vector is received or generated or otherwise selected in the rover station in a step 802. In a step 804, GPS signals are received at a reference position by a real time kinematic (RTK) GPS receiver in a GPS reference station. In a step 806 the reference GPS receiver measures carrier phases of the GPS signals. In a step 808 the reference system transmits secure reference data that includes the reference position and measured reference phases in a secure format to the rover station.

The secure rover station receives the reference data in a step 814. The rover GPS receiver receives the GPS signals from the same GPS satellites in a step 816. In a step 818 the rover GPS receiver measures the carrier phases of the same GPS signals. In a step 820, the reference and rover phases are tested for the integrity of the phase measurements. In a step 822 the rover GPS receiver uses the reference data and the rover GPS phase measurements for determining a secure rover position. The secure position is not made available to normal users of the rover station. In a step 824 the rover station dithers the secure rover position with the synthetic offset vector from the step 802 to provide an unsecure rover position to users of the secure rover station. The unsecure rover position has the added error equivalent to the synthetic position offset.

Figure 15:
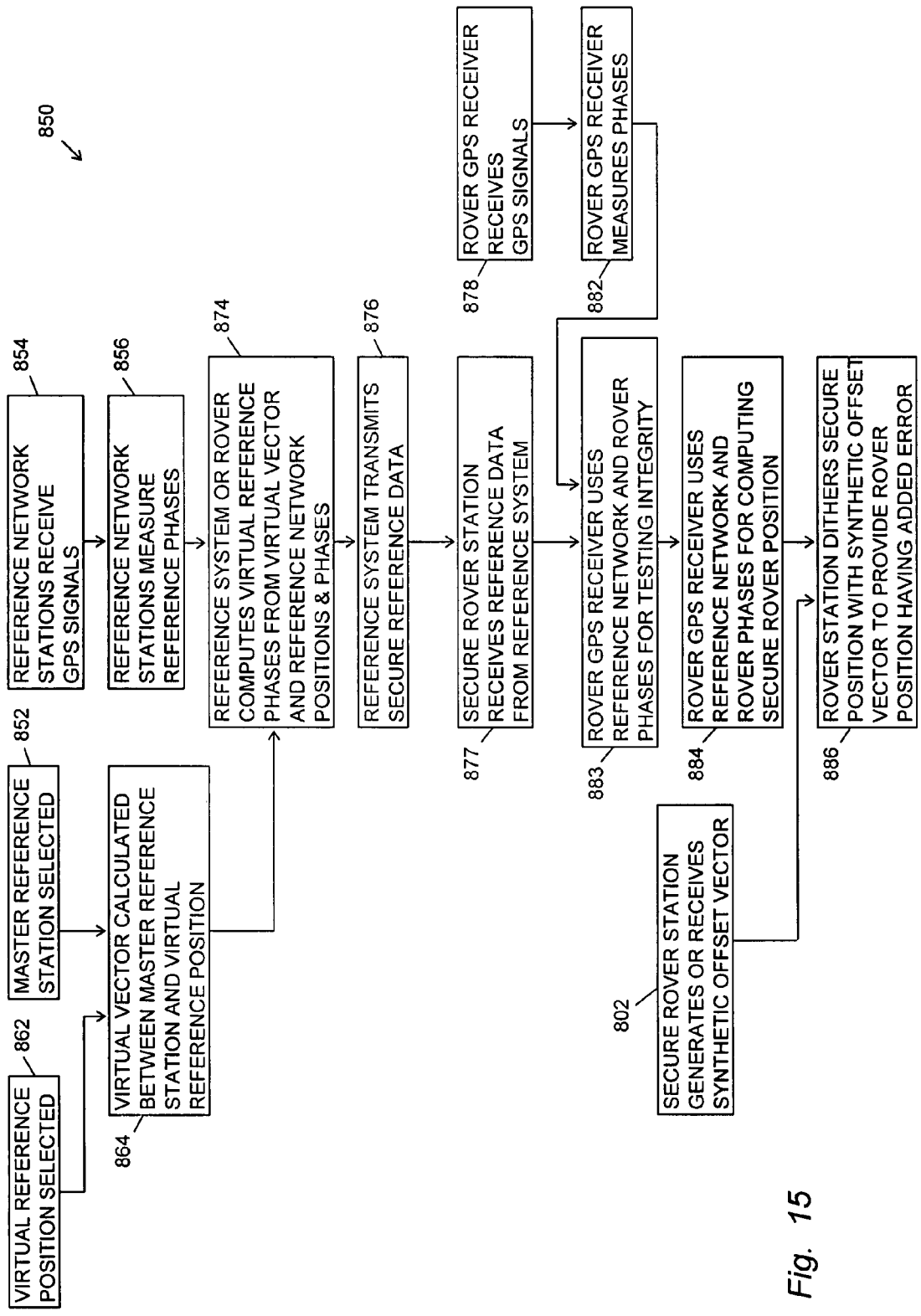
FIG. 15 is a flow chart of the method for dithering secure rover position for providing an added error to a rover position in a reference network positioning system.

FIG. 15 is a flow chart of steps of a method for adding an error, shown and described above as the added error 239, to a rover position. The steps may be embodied in a tangible medium 850 containing instructions that may be read by a processor or processors for causing the rover station to carry out the steps. The medium 850 may be constructed with one or more memory devices such as compact disks, electronic memory chips, hard disks, digital video devices, or the like. The processor may be a device commonly known as a computer or a microprocessor.

A synthetic offset vector is received or generated or otherwise selected in a secure rover station in the step 802. In a step 852 one of a network of reference stations is selected or designated as the master reference station. In a step 854 GPS signals are received by real time kinematic (RTK) GPS receivers at GPS reference network stations. In a step 856 the reference GPS receivers measure reference network phases for the carriers of the GPS signals.

A virtual reference position is selected by the system or negotiated between the system and the rover station in a step 862. In a step 864 a virtual vector is calculated from the position of the master reference station to the virtual reference position. In a step 874 the system or rover computes virtual reference phases from the virtual reference vector and the reference network positions and phases. In a step 876 the system transmits reference data including the reference phases in a secure format to the rover station. In a step 877 the is secure rover station receives the reference data.

A GPS receiver in the rover station receives the GPS signals from the same GPS satellites in a step 878. In a step 882 the rover GPS receiver measures the carrier phases of the same GPS signals. In a step 883, the reference network and rover phases are tested for the integrity of the phase measurements. In a step 884 the rover GPS receiver uses the reference network and the rover GPS phase measurements for determining a secure rover position. The secure position is not made available to normal users of the rover station. In a step 886 the rover station dithers the secure rover position with the synthetic offset vector to provide an unsecure rover position to users of the rover station. The unsecure rover position has the added error that is equivalent to the synthetic offset vector.

The reference data, rover stations, and structural parts of the rover stations are described in several embodiments of the invention as secure. In the context of the invention, the term "secure" means that security provisions have been made to inhibit or prevent unauthorized users from viewing, accessing or changing the signals, the data or the algorithms in the secure elements. The security provisions may include encryption, the privacy measures of the Digital Millennium Copyright Act of 1998 for preventing unauthorized access to a copyrighted work, and physical constraints such as sealed packaging and using embedded codes, signals and data in ways so that it is physically or mechanically difficult view, access or change the codes, signals and data. A secure position is only available to an authorized user. An unsecure position is a position that is available to unauthorized (normal) users.

The provider of the reference system, the provider of the reference data, and/or the provider of the algorithms for controlling the positional accuracy of the rover station designate the parties that are authorized users. All other users of the reference system, reference data and/or rover stations are unauthorized users. Anyone not designated by the provider for controlling the position accuracy is an "unauthorized user". The unauthorized user is constrained from using the rover station for obtaining a positional accuracy that does not have the added positional error that is controlled by the provider. In general the provider is or represents the seller of the reference system, the reference data, or the rover station and the unauthorized user is the one who is using the rover station for field work as the normal user or end user for the rover positions.

The FIGS. 2 and 10 illustrate embodiments where a single reference station system generates synthetic reference phases and provides the synthetic reference phases in an unsecure (public) signal to an existing rover station. The FIGS. 3 and 11 illustrate embodiments where a reference network system generates synthetic reference phases and provides the synthetic reference phases in a public signal to an existing rover station. The FIGS. 4 and 12 illustrate embodiments where a secure rover station synthesizes synthetic reference phases from the true reference phases received in a secure (private) signal from a single reference station system. The FIGS. 5 and 13 illustrate embodiments where a secure rover station synthesizes synthetic reference phases from the true reference phases received in a secure (private) signal from a reference network system.

The FIGS. 7 and 14 illustrate embodiments where a secure rover station receives reference data in a secure (private) signal from a single reference station system, computes a secure private true position and dithers the secure position with a synthetic offset vector for providing an unsecure position to a user. The FIGS. 8 and 15 illustrate embodiments where a rover station receives reference data in a secure (private) signal from a reference network system, computes a true secure private position and dithers the secure position with a synthetic offset vector for providing an unsecure position to a user.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A rover station for providing a position with a selected error, comprising:
   a rover global navigation satellite system (GNSS) receiver constructed for using a GNSS signal for determining a first position not available to a user of the rover station; and
   a position dither processor for adding a non-zero synthetic offset vector to said first position for providing a second position available to said user.

2. The rover station of claim 1, wherein:
   the rover GNSS receiver is constructed for measuring rover phases for said GNSS signal, and using said rover phases and reference phases received from a GNSS reference system for said GNSS signal for determining said first position.

3. The rover station of claim 2, further comprising:
an anomaly detector for detecting an anomaly when a phase residual exceeds a selected phase residual limit; and wherein:
the rover GNSS receiver is constructed for using said rover phases and said reference phases for determining said phase residual and using a detection of said anomaly for determining when said second position cannot be provided with a selected integrity.

4. The rover station of claim 3, wherein:
the rover GNSS receiver is constructed for inhibiting the availability of said second position when said anomaly is detected.

5. The rover station of claim 3, wherein:
said synthetic offset vector is up to about five meters; and said selected integrity is less than about fifty centimeters.

6. The rover station of claim 3, wherein:
the rover GNSS receiver is constructed for determining said phase residual as a difference between a current phase difference and an expected phase difference, said current phase difference based on differences between said measured rover phases and said reference phases, said expected phase difference based on previous determinations of differences between said measured rover phases and said reference phases.

7. The rover station of claim 2, wherein:
the rover GNSS receiver is constructed for using a plurality of reference network phases, including said reference phases, measured by a plurality of reference network GNSS receivers at a plurality of reference network positions, respectively, with said plurality of reference network positions for determining virtual reference phases for a virtual reference position not co-located with any of said reference network GNSS receivers, and using said virtual reference phases and said virtual reference position for determining said first position.

8. The rover station of claim 1, wherein:
the position dither processor includes a vector generator for providing a stream of vectors for said synthetic offset vector, and dithering said first position with said stream of vectors for providing said second position.

9. The rover station of claim 8, wherein:
said vector generator is constrained for generating said synthetic offset vector within one of a horizontal plane, a vertical direction, a zone having a spherical boundary, a zone having a cylindrical boundary, or a zone having a box-shaped boundary.

10. A tangible medium containing a set of instructions for causing a processor to carry out the following steps for providing a position with a selected error, comprising:
using a global navigation satellite system (GNSS) signal for determining a first position not available to a user of the rover station; and
adding a selected non-zero synthetic offset vector to said first position for providing a second position available to said user.

11. A method for providing a position with a selected error, comprising:
using a global navigation satellite system (GNSS) signal for determining a first position not available to a user of the rover station; and
adding a selected non-zero synthetic offset vector to said first position for providing a second position available to said user.

12. The method of claim 11, further comprising:
receiving said GNSS signal;
measuring rover phases for said GNSS signal;
receiving reference phases from a GNSS reference system for said GNSS signal;
computing said first position from said measured rover phases and said reference phases.

13. The method of claim 12, wherein:
determining a phase residual based on said rover phases and said reference phases;
detecting an anomaly when said phase residual exceeds a selected phase residual limit; and
using a detection of said anomaly for determining when said second position cannot be provided with a selected integrity.

14. The method of claim 13, further comprising:
inhibiting the availability of said second position when said anomaly is detected.

15. The method of claim 13, wherein:
said synthetic offset vector has a length up to about five meters; and
said selected integrity is less than about fifty centimeters.

16. The method of claim 13, wherein:
determining said phase residual includes determining a difference between a current phase difference and an expected phase difference, said current phase difference based on differences between said measured rover phases and said reference phases, said expected phase difference based on previous determinations of differences between said measured rover phases and said reference phases.

17. The method of claim 12, wherein:
determining said first position includes using a plurality of reference network phases, including said reference phases, measured by a plurality of reference network GNSS receivers at a plurality of reference network positions, respectively, with said plurality of reference network positions for determining virtual reference phases for a virtual reference position not co-located with any of the reference network GNSS receivers; and
using said virtual reference phases and said virtual reference position for determining said first position.

18. The method of claim 11, further comprising:
generating a stream of vectors for said synthetic offset vector; and
dithering said first position with said stream of vectors for providing said second position.

19. The method of claim 18, further comprising:
constraining said synthetic offset vector to one of a horizontal plane, a vertical direction, a zone having a spherical boundary, a zone having a cylindrical boundary, or a zone having a box-shaped boundary.

* * * * *